United States Patent
Jade et al.

(10) Patent No.: US 10,699,081 B2
(45) Date of Patent: *Jun. 30, 2020

(54) HUMAN LANGUAGE ANALYZER FOR DETECTING CLAUSES, CLAUSE TYPES, AND CLAUSE RELATIONSHIPS

(71) Applicant: SAS Institute Inc., Cary, NC (US)

(72) Inventors: Teresa S. Jade, Cary, NC (US); Wei-shan Chiang, Cary, NC (US); Aaron Douglas Arthur, Raleigh, NC (US); Seng Lee, Cary, NC (US); Qin Yang, Beijing (CN); Xu Yang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,615

(22) Filed: Oct. 17, 2019

(65) Prior Publication Data

US 2020/0050672 A1 Feb. 13, 2020

Related U.S. Application Data

(63) Continuation of application No. 16/380,353, filed on Apr. 10, 2019, now Pat. No. 10,467,344.

(Continued)

(51) Int. Cl.
*G06F 17/27* (2006.01)
*G06F 40/30* (2020.01)

(Continued)

(52) U.S. Cl.
CPC ............ *G06F 40/30* (2020.01); *G06F 40/205* (2020.01); *G06F 40/284* (2020.01)

(58) Field of Classification Search
None
See application file for complete search history.

(56) References Cited

U.S. PATENT DOCUMENTS 4,864,502 A   9/1989 Kucera et al.
4,887,212 A   12/1989 Zamora et al.
(Continued)

OTHER PUBLICATIONS

Orăsan, C., "A hybrid method for clause splitting in unrestricted English texts", Proceedings of ACIDCA, 2000, pp. 1-6.
(Continued)

*Primary Examiner* — Satwant K Singh
(74) *Attorney, Agent, or Firm* — Coats & Benett PLLC

(57) ABSTRACT

A human language analyzer receives, at the human language analyzer, text data representing information in a human language. The human language analyzer receives a computer command for identifying a text data component of the text data. The computer command comprises at least two requirements for the text data component. The human language analyzer, responsive to identifying that the first requirement and the second requirement are met, locates the text data component from one of two clauses. A clause analyzer receives a clause request to locate clauses within text data representing information in a human language. The clause analyzer receives, responsive to a dependency request, token information in a token data set. The clause analyzer determines a location for each clause of the sentence portion in a hierarchy of clauses. The clause analyzer generates and outputs a new data set based on the token data set and the hierarchy of clauses.

30 Claims, 16 Drawing Sheets

Related U.S. Application Data

(60) Provisional application No. 62/713,627, filed on Aug. 2, 2018.

(51) Int. Cl.
*G06F 40/205* (2020.01)
*G06F 40/284* (2020.01)

(56) References Cited

U.S. PATENT DOCUMENTS

| | | | |
|---|---|---|---|
| 5,694,592 | A | 12/1997 | Driscoll |
| 5,878,385 | A | 3/1999 | Bralich et al. |
| 5,903,858 | A | 5/1999 | Saraki |
| 6,112,168 | A | 8/2000 | Corston et al. |
| 6,240,408 | B1 | 5/2001 | Kaufman |
| 6,295,529 | B1 | 9/2001 | Corston-Oliver et al. |
| 6,601,026 | B2 | 7/2003 | Appelt et al. |
| 6,665,666 | B1 | 12/2003 | Brown et al. |
| 6,732,097 | B1 | 5/2004 | Wakefield et al. |
| 6,996,575 | B2 | 2/2006 | Cox et al. |
| 7,136,806 | B2 | 11/2006 | Miyahira et al. |
| 7,366,711 | B1 | 4/2008 | McKeown et al. |
| 8,196,030 | B1* | 6/2012 | Wang ............... G06K 9/00442 345/581 |
| 8,264,502 | B2* | 9/2012 | Wang ............... G06K 9/00442 345/156 |
| 8,380,489 | B1* | 2/2013 | Zhang ............... G06F 17/2785 704/4 |
| 8,587,613 | B2* | 11/2013 | Wang ............... G06K 9/00442 345/156 |
| 9,183,274 | B1* | 11/2015 | Zhang ............... G06F 17/2785 |
| 9,280,747 | B1 | 3/2016 | Jin et al. |
| 9,460,071 | B2 | 10/2016 | Avasarala et al. |
| 9,613,024 | B1* | 4/2017 | Zhang ............... G06F 17/2785 |
| 9,645,993 | B2 | 5/2017 | Zuev et al. |
| 9,805,025 | B2 | 10/2017 | Gidney |
| 10,248,653 | B2* | 4/2019 | Blassin ............ G06Q 10/06311 |
| 10,467,344 | B1* | 11/2019 | Jade ...................... G06F 40/205 |
| 2005/0210046 | A1 | 9/2005 | Brunecky |
| 2009/0199090 | A1* | 8/2009 | Poston ................. G06F 16/907 715/255 |
| 2010/0169309 | A1 | 7/2010 | Barrett et al. |
| 2011/0055206 | A1 | 3/2011 | Martin et al. |
| 2011/0270607 | A1 | 11/2011 | Zuev |
| 2013/0151236 | A1 | 6/2013 | Iofinov |
| 2014/0059073 | A1 | 2/2014 | Zhao et al. |
| 2014/0085323 | A1* | 3/2014 | Wang ............... G06K 9/00442 345/581 |
| 2014/0089247 | A1 | 3/2014 | Cox et al. |
| 2014/0136188 | A1 | 5/2014 | Wroczynski et al. |
| 2014/0337271 | A1 | 11/2014 | Cox et al. |
| 2015/0104762 | A1 | 4/2015 | Luke et al. |
| 2015/0242762 | A1 | 8/2015 | Cox et al. |
| 2016/0042058 | A1 | 2/2016 | Nguyen |
| 2016/0350652 | A1 | 12/2016 | Min et al. |
| 2016/0357731 | A1 | 12/2016 | Zorzin |
| 2018/0143975 | A1* | 5/2018 | Casal .................. G06F 17/2785 |

OTHER PUBLICATIONS

Puşcaşu, G., "A Multilingual Method for Clause Splitting", Proceedings of the 7th Annual Colloquium for the UK Special Interest Group for Computational Linguistics, Jan. 2004, pp. 1-8, Birmingham, UK.

Krůza, O. et al., "Automatic Extraction of Clause Relationships from a Treebank", International Conference on Intelligent Text Proceedings andn Computational Linguistics: Computational Linguistics and Intelligent Text Processing, 2009, pp. 1-12.

Krůza, O. et al., "Automatic Recognition of Clauses", IJCLA Jan.-Jun. 2014, pp. 117-128, vol. 5, No. 1.

Del Corro, L. et al., "ClausIE: Clause-Based Open Information Extraction", Proceedings of the 22nd International Conference on Word Wide Web, May 2013, pp. 1-11.

Gamallo, P. et al., "Dependency-Based Open Information Extraction", Proceedings of the Joint Workshop on Unsupervised and Semi-Supervised Learning in NLP, Apr. 23-27, 2012, pp. 10-18, Avignon, France.

Sang, E. et al., "Introduction to the CoNLL-2001 Shared Task", Proceedings of the 2001 Workshop on Computational Natural Language Learning—vol. 7, Jul. 6-7, 2001, pp. 1-5, Toulouse, France.

Cao, K. et al., "Leveraging Dependency Regularization for Event Extraction", Proceedings of the Twenty-Ninth International Florida Artificial Intelligence Research Society Conference, Mar. 2016, pp. 1-6.

Zouaq, A. et al., "Linguistic Patterns for Information Extraction in OntoCmaps", Proceedings of the 3rd International Conference on Ontology Patterns, Jan. 2012, pp. 61-72.

Mausam et al., "Open Language Learning for Information Extraction", Proceedings of the 2012 Joint Conference on Empirical Methods in Natural Language Processing and Computational Natural Language Learning, Jul. 12-14, 2012, pp. 523-534, Jeju Island, Korea.

Kaalep, H. et al., "Robust clause boundary identification for corpus annotation", Proceedings of the Eighth International Conference on Language Resources and Evaluation, May 2012, pp. 1632-1636, Instanbul, Turkey.

Ram, R. et al., "Clause Boundary Identification Using Conditional Random Fields", Proceedings of the 9th International Conference on Computational Linguistics and Intelligent Text Processing, Feb. 17-23, 2008, pp. 140-150, Haifa, Israel.

Bies, A. et al., "Bracketing Guidelines for Treebank II Style Penn Treebank Project", Jan. 1995, pp. 1-318.

\* cited by examiner

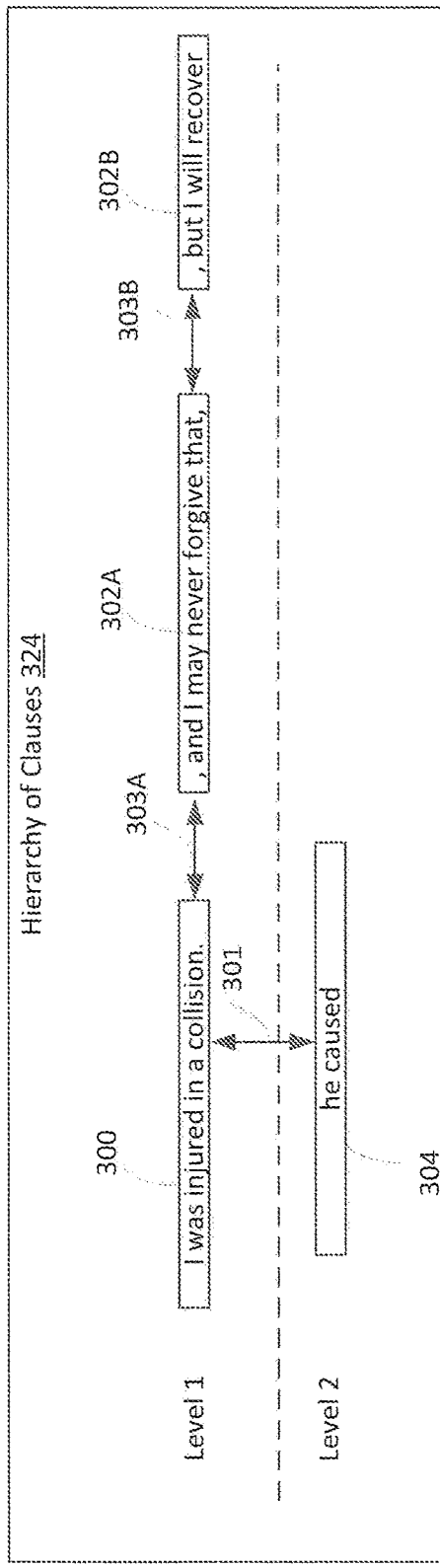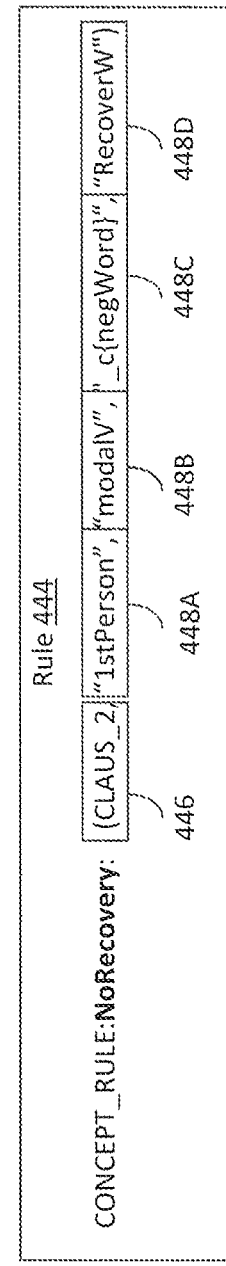
FIG. 4

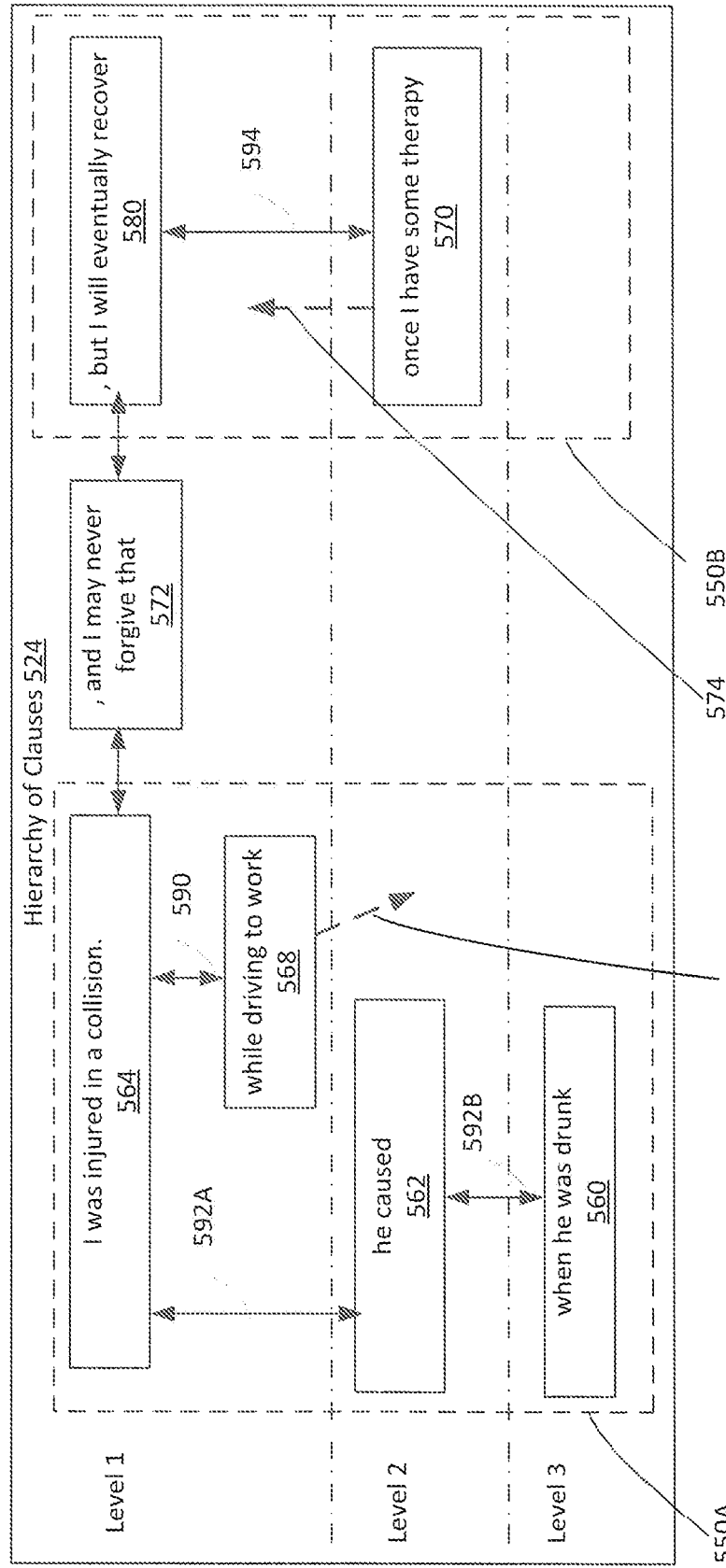

| id | word | lemma | tag | xtag | head | deprel | start | end | sid | cpath | mcid |
|----|------|-------|-----|------|------|--------|-------|-----|-----|-------|------|
| 1  | I        | i         | PRO  | Pro  | 3  | nsubj:pass | 81  | 81  | 1 | 0   | 1 |
| 2  | was      | be        | V    | BEpr | 3  | aux:pass   | 83  | 85  | 1 | 0   | 1 |
| 3  | injured  | injure    | V    | Vpp  | 0  | root       | 87  | 93  | 1 | 0   | 1 |
| 4  | in       | in        | PPOS | Prep | 6  | case       | 95  | 96  | 1 | 0   | 1 |
| 5  | a        | a         | DET  | Det  | 6  | det        | 98  | 98  | 1 | 0   | 1 |
| 6  | collision| collision | N    | N    | 3  | obl        | 100 | 108 | 1 | 0   | 1 |
| 7  | he       | he        | PRO  | Pro  | 8  | nsubj      | 110 | 111 | 1 | 1,0 | 0 |
| 8  | caused   | cause     | V    | Vpt  | 6  | acl:relcl  | 113 | 118 | 1 | 1,0 | 0 |
| 9  | ,        | ,         | PUNC | sep  | 3  | punct      | 119 | 119 | 1 | 0   | 1 |
| 10 | and      | and       | CONJ | C    | 14 | cc         | 121 | 123 | 1 | 3   | 3 |
| 11 | I        | i         | PRO  | Pro  | 14 | nsubj      | 125 | 125 | 1 | 3   | 3 |
| 12 | may      | may       | V    | Md   | 14 | aux        | 127 | 129 | 1 | 3   | 3 |
| 13 | never    | never     | ADV  | Adv  | 14 | advmod     | 131 | 135 | 1 | 3   | 3 |
| 14 | forgive  | forgive   | V    | V    | 3  | conj       | 137 | 143 | 1 | 3   | 3 |
| 15 | that     | that      | PRO  | Pro  | 14 | obj        | 145 | 148 | 1 | 3   | 3 |
| 16 | ,        | ,         | PUNC | sep  | 3  | punct      | 149 | 149 | 1 | 0   | 1 |
| 17 | but      | but       | CONJ | C    | 20 | cc         | 151 | 153 | 1 | 2   | 2 |
| 18 | I        | i         | PRO  | Pro  | 20 | nsubj      | 155 | 155 | 1 | 2   | 2 |
| 19 | will     | will      | V    | Md   | 20 | aux        | 157 | 160 | 1 | 2   | 2 |
| 20 | recover  | recover   | V    | V    | 3  | conj       | 162 | 168 | 1 | 2   | 2 |
| 21 | .        | .         | PUNC | sep  | 3  | punct      | 169 | 169 | 1 | 0   | 1 |

FIG. 10

| id | word | literal | lemma | tag | xtag | head | deprel | start | end | sid |
|---|---|---|---|---|---|---|---|---|---|---|
| 1 | I | I | i | PRO | Pro | 2 | nsubj | 0 | 0 | 0 |
| 2 | searched | searched | search | V | Vpt | 0 | root | 2 | 9 | 0 |
| 3 | all | all | all | ADV | Adv | 6 | advmod | 11 | 13 | 0 |
| 4 | over | over | over | PPOS | Prep | 6 | case | 15 | 18 | 0 |
| 5 | the | the | the | DET | Det | 6 | det | 20 | 22 | 0 |
| 6 | internet | internet | internet | N | N | 2 | obl | 24 | 31 | 0 |
| 7 | , | , | , | PUNC | sep | 2 | punct | 32 | 32 | 0 |
| 8 | and | and | and | CONJ | C | 12 | cc | 34 | 36 | 0 |
| 9 | I | I | i | PRO | Pro | 12 | nsubj | 38 | 38 | 0 |
| 10 | could | could | can | V | Md | 12 | aux | 40 | 44 | 0 |
| 11 | not | n't | not | ADV | Adv | 12 | advmod | 45 | 47 | 0 |
| 12 | find | find | find | V | V | 2 | conj | 49 | 52 | 0 |
| 13 | one | one | one | NUM | Num | 14 | nummod | 54 | 56 | 0 |
| 14 | place | place | place | N | N | 12 | obj | 58 | 62 | 0 |
| 15 | in | in | in | PPOS | Prep | 17 | case | 64 | 65 | 0 |
| 16 | Tampa | Tampa | tampa | PN | PN | 17 | compound | 67 | 71 | 0 |
| 17 | Bay | Bay | Bay | PN | PN | 14 | nmod | 73 | 75 | 0 |
| 18 | that | that | that | PRO | RelPro | 19 | nsubj | 77 | 80 | 0 |
| 19 | sells | sells | sell | V | V3sg | 14 | acl:relcl | 82 | 86 | 0 |
| 20 | morcillas | morcillas | morcillas | N | inc | 19 | obj | 88 | 96 | 0 |
| 21 | , | , | , | PUNC | sep | 20 | punct | 97 | 97 | 0 |
| 22 | also | also | also | ADV | Adv | 23 | advmod | 99 | 102 | 0 |
| 23 | known | known | know | V | Vpp | 20 | acl | 104 | 108 | 0 |
| 24 | as | as | as | PPOS | Prep | 26 | case | 110 | 111 | 0 |
| 25 | blood | blood | blood | N | N | 26 | compound | 113 | 117 | 0 |
| 26 | pudding | pudding | pudding | N | N | 23 | obl | 119 | 125 | 0 |
| 27 | and | and | and | CONJ | C | 29 | cc | 127 | 129 | 0 |
| 28 | blood | blood | blood | N | N | 29 | compound | 131 | 135 | 0 |
| 29 | sausages | sausages | sausage | N | Npl | 26 | conj | 137 | 144 | 0 |
| 30 | . | . | . | PUNC | sep | 2 | punct | 145 | 145 | 0 |

*FIG. 11A*

| id | word | tag | cid | mcid | cpath | clauseHeadID | clauseHeadFlag | clauseType | subtreeSize |
|---|---|---|---|---|---|---|---|---|---|
| 1 | I | PRO | 0 | 1 | 0 | 2 | 0 | M | 1 |
| 2 | searched | V | 0 | 1 | 0 | 2 | 1 | M | 30 |
| 3 | all | ADV | 0 | 1 | 0 | 2 | 0 | M | 1 |
| 4 | over | PPOS | 0 | 1 | 0 | 2 | 0 | M | 1 |
| 5 | the | DET | 0 | 1 | 0 | 2 | 0 | M | 1 |
| 6 | internet | N | 0 | 1 | 0 | 2 | 0 | M | 4 |
| 7 | , | PUNC | 0 | 1 | 0 | 2 | 0 | M | 1 |
| 8 | and | CONJ | 3 | 2 | 3 | 12 | 0 | M | 1 |
| 9 | I | PRO | 3 | 2 | 3 | 12 | 0 | M | 1 |
| 10 | could | V | 3 | 2 | 3 | 12 | 0 | M | 1 |
| 11 | not | ADV | 3 | 2 | 3 | 12 | 0 | M | 1 |
| 12 | find | V | 3 | 2 | 3 | 12 | 1 | M | 22 |
| 13 | one | NUM | 3 | 2 | 3 | 12 | 0 | M | 1 |
| 14 | place | N | 3 | 2 | 3 | 12 | 0 | M | 17 |
| 15 | in | PPOS | 3 | 2 | 3 | 12 | 0 | M | 1 |
| 16 | Tampa | PN | 3 | 2 | 3 | 12 | 0 | M | 1 |
| 17 | Bay | PN | 3 | 2 | 3 | 12 | 0 | M | 3 |
| 18 | that | PRO | 1 | 0 | 1,3 | 19 | 0 | M | 1 |
| 19 | sells | V | 1 | 0 | 1,3 | 19 | 1 | M | 12 |
| 20 | morcillas | N | 1 | 0 | 1,3 | 19 | 0 | M | 10 |
| 21 | , | PUNC | 1 | 0 | 1,3 | 19 | 0 | B | 1 |
| 22 | also | ADV | 2 | 0 | 2,1,3 | 23 | 0 | B | 1 |
| 23 | known | V | 2 | 0 | 2,1,3 | 23 | 1 | B | 8 |
| 24 | as | PPOS | 2 | 0 | 2,1,3 | 23 | 0 | B | 1 |
| 25 | blood | N | 2 | 0 | 2,1,3 | 23 | 0 | B | 1 |
| 26 | pudding | N | 2 | 0 | 2,1,3 | 23 | 0 | B | 6 |
| 27 | and | CONJ | 2 | 0 | 2,1,3 | 23 | 0 | B | 1 |
| 28 | blood | N | 2 | 0 | 2,1,3 | 23 | 0 | B | 1 |
| 29 | sausages | N | 2 | 0 | 2,1,3 | 23 | 0 | B | 3 |
| 30 | . | PUNC | 0 | 1 | 0 | 2 | 0 | M | 1 |

FIG. 11B

HUMAN LANGUAGE ANALYZER FOR DETECTING CLAUSES, CLAUSE TYPES, AND CLAUSE RELATIONSHIPS

RELATED APPLICATIONS

This application is a continuation of U.S. application Ser. No. 16/380,353, filed Apr. 10, 2019, which claims the benefit of U.S. Provisional Application No. 62/713,627, filed Aug. 2, 2018, the disclosures of each of which are incorporated herein by reference in their entirety.

BACKGROUND

Natural language data processing involves processing of computer commands (e.g., rules) to enable computers to derive meaning from natural language input. Natural language can also be referred to as human language. For instance, U.S. Pat. No. 9,460,071 assigned to SAS Institute Inc., of Cary, N.C. includes example of rules for natural language data processing (e.g., PREDICATE_RULE and CONCEPT_RULE rules), the disclosure of which is incorporated herein by reference in its entirety.

SUMMARY

In one example embodiment, a computer-program product tangibly embodied in a non-transitory machine-readable storage medium is provided. The computer-program product includes instructions operable to cause a clause analyzer to receive a clause request, at the clause analyzer, to locate clauses within text data representing information in a human language. The text data comprises a plurality of clauses of a sentence portion. The computer-program product includes instructions operable to cause a clause analyzer to generate, responsive to the clause request, a dependency request to a dependency parser to determine dependency information for a plurality of tokens of the plurality of clauses of the sentence portion. Each token of the plurality of tokens comprises one or more characters of the text data. The dependency information indicates a dependency of a respective token of the sentence portion on at least one other token of the sentence portion or that the token is the head of the sentence with a "root" dependency relation. The computer-program product includes instructions operable to cause a clause analyzer to receive, responsive to the dependency request, token information in a token data set. The token information comprises one or more token identifiers of identified tokens in the sentence portion of the text data. The token information comprises dependency information indicating a dependency of a respective token of the identified tokens on at least one other token of the sentence portion or that the token is the head of the sentence with a "root" dependency relation. The computer-program product includes instructions operable to cause a clause analyzer to determine a location for each of the plurality of clauses of the sentence portion in a hierarchy of clauses by associating to each clause in the sentence portion: one of a plurality of levels of the hierarchy of clauses; and any respective connection to a clause associated to a different level of the plurality of levels. The computer-program product includes instructions operable to cause a clause analyzer to generate and output a new data set based on the token data set and the hierarchy of clauses. The new data set comprises information representing the token information and one or more location identifiers indicating a location of a respective token of the token information according to a location, in the hierarchy of clauses, of a clause comprising the respective token of the token information.

In one or more embodiments, the instructions are operable to cause the clause analyzer to detect that a clause of the plurality of clauses of the sentence portion is an interrupted clause with all or a portion of words of an embedded clause of the plurality of clauses between words of the interrupted clause in the text data. The instructions are operable to cause the clause analyzer to determine a location for the embedded clause and the interrupted clause in the hierarchy of clauses by associating different levels of the plurality of levels of the hierarchy of clauses to the embedded clause and the interrupted clause. In one or more embodiments, the instructions are operable to cause the clause analyzer to determine the location of the embedded clause based on a clause type of the embedded clause. The clause type is one of a main clause, a balanced subordinate clause, and a de-ranked subordinate clause.

In one or more embodiments, the token information comprises a same indication of a coordination token for any type of coordinating conjunction word in the sentence portion. The instructions are operable to cause the clause analyzer to classify at most one token in each respective clause of the plurality of clauses as a head of the respective clause; and classify a given token as a head of a first clause in the hierarchy of clauses when a given coordination token indicates a relationship between the first clause and a second clause and the second clause contains a token identified as the head of the second clause.

In one or more embodiments, the instructions are operable to cause the clause analyzer to obtain a dependency tree of the sentence portion based on the dependency information. The dependency tree comprises a root that is a main predicate in the sentence portion and the dependency tree indicates a syntactic relationship of each token in the sentence portion from the root. The associating the any respective connection comprises identifying a main clause of the hierarchy of clauses, using the dependency tree, and a connection between the main clause and another clause in the sentence portion at an adjacent level.

In one or more embodiments, the instructions are operable to cause the clause analyzer to generate the new data set by appending the one or more location identifiers to the token data set.

In one or more embodiments, the token information further comprises in addition to the dependency information: morphological information of the respective token and part of speech information of the respective token. The morphological information comprises a root form of a token identified in the sentence portion of the text data.

In one or more embodiments, the instructions are operable to cause the clause analyzer to generate the new data set by generating, for each token represented in the token information, a main clause identifier indicating whether a clause comprising a respective token is a main clause or a subordinate clause. In one or more embodiments, the instructions are operable to cause the clause analyzer to: identify a subordinate clause in the plurality of clauses; and generate a zero for a given main clause identifier indicating the clause is a subordinate clause. In one or more embodiments, the instructions are operable to cause the clause analyzer to identify a detection ordering of main clauses of the plurality of clauses of the sentence portion; and generate a numeral for a given main clause identifier uniquely representing an identified position in the detection ordering. In one or more embodiments, the instructions are operable to cause the clause analyzer to identify whether a first clause of the plurality of clauses of the sentence portion is a main clause, balanced subordinate clause, or de-ranked subordinate clause. The instructions are operable to cause the clause analyzer to generate an explicit indication for a main clause identifier for the first clause explicitly indicating whether the first clause is a main clause, balanced subordinate clause, or de-ranked subordinate clause.

In one or more embodiments, the instructions are operable to cause the clause analyzer to determine a first location of a first clause of the plurality of clauses of the sentence portion by associating a first level of the hierarchy of clauses to the first clause. The instructions are operable to cause the clause analyzer to determine a second location of a second clause of the plurality of clauses of the sentence portion by associating a second level of the hierarchy of clauses to the second clause. The second level is different than the first level. The instructions are operable to cause the clause analyzer to determine a path from the determined first location of the first clause in the hierarchy of clauses to the determined second location of the second clause in the hierarchy of clauses. The instructions are operable to cause the clause analyzer to generate the new data set by generating, for respective tokens of the first clause, a clause hierarchy identifier indicating the path from the first location of the first clause to the second location of the second clause. In one or more embodiments, the instructions are operable to cause the clause analyzer to determine respective locations for one or more clauses with levels intermediate to the first level and the second level of the hierarchy of clauses. The instructions are operable to cause the clause analyzer to obtain the path from the first location to the second location with the determined respective locations for one or more clauses with levels intermediate to the first level and the second level. The instructions are operable to cause the clause analyzer to generate the new data set by generating the clause hierarchy identifier indicating the one or more clauses with locations intermediate between the first clause and the second clause.

In one or more embodiments, the instructions are operable to cause the clause analyzer to classify each token in each respective clause of the plurality of clauses as a head of the respective clause or a member of the respective clause. The instructions are operable to cause the clause analyzer to generate the new data set by generating, for each token represented in the token information, a clause head indicator indicating whether a respective token is classified by the clause analyzer as a head of the respective clause or as a non-head member of the respective clause.

In one or more embodiments, the instructions are operable to cause the clause analyzer to classify by the clause analyzer a token represented in the token information as a token that heads a de-ranked subordinate clause of the plurality of clauses. The instructions are operable to cause the clause analyzer to determine the location of the de-ranked subordinate clause in the hierarchy of clauses based on the classified token that heads the de-ranked subordinate clause.

In one or more embodiments, the instructions are operable to cause the clause analyzer to augment a location of a given clause in the hierarchy of clauses by associating with the given clause a new level in the plurality of levels that is different than a previous level associated to given clause in the hierarchy of clauses. The given clause is a de-ranked subordinate clause or a balanced subordinate clause.

In one or more embodiments, the one or more location identifiers indicate a balanced subordinate clause or promoted de-ranked subordinate clause is at a child location relative to a respective parent clause in the hierarchy of clauses.

In one or more embodiments, the one or more location identifiers indicate a de-ranked subordinate clause or demoted subordinate clause is a same level as a respective parent clause in the hierarchy of clauses.

In one or more embodiments, the text data comprises English language text data.

In one or more embodiments, the instructions are operable to cause the clause analyzer to receive token information comprising identification of each token of the sentence portion of the text data in a matrix that comprises one or more of: a unique identifier for each token that uniquely identifies within the sentence portion a given string of characters as a token; and an indication of a length, start, or end of characters forming a token within the sentence portion.

In another example, a computer-implemented method is provided. The computer-implemented method includes receiving a clause request, at a clause analyzer, to locate clauses within text data representing information in a human language. The text data comprises a plurality of clauses of a sentence portion. The computer-implemented method includes generating, responsive to the clause request, a dependency request to a dependency parser to determine dependency information for a plurality of tokens of the plurality of clauses of the sentence portion. Each token of the plurality of tokens comprises one or more characters of the text data, and the dependency information indicates a dependency of a respective token of the sentence portion on at least one other token of the sentence portion or that it is the head of the sentence. The computer-implemented method includes receiving, responsive to the dependency request, token information in a token data set. The token information comprises one or more token identifiers of identified tokens in the sentence portion of the text data. The token information comprises dependency information indicating a dependency of a respective token of the identified tokens on at least one other token of the sentence portion. The computer-implemented method includes determining a location for each of the plurality of clauses of the sentence portion in a hierarchy of clauses by associating to each clause in the sentence portion one of a plurality of levels of the hierarchy of clauses, and any respective connection to a clause associated to a different level of the plurality of levels. The computer-implemented method includes generating and outputting a new data set based on the token data set and the hierarchy of clauses. The new data set comprises information representing the token information, and one or more location identifiers indicating a location of a respective token of the token information according to a location, in the hierarchy of clauses, of a clause comprising the respective token of the token information.

In one or more embodiments, the computer-implemented method comprises a method to implement any of the instructions of the computer-program product as described herein.

In one or more embodiments, the computer-implemented method includes detecting that a clause of the plurality of clauses of the sentence portion is an interrupted clause with all or a portion of words of an embedded clause of the plurality of clauses between words of the interrupted clause in the text data. The computer-implemented method includes determining a location for the embedded clause and the interrupted clause in the hierarchy of clauses by associating different levels of the plurality of levels of the hierarchy of clauses to the embedded clause and the interrupted clause.

In one or more embodiments, the token information comprises a same indication of a coordination token for any type of coordinating conjunction word in the sentence portion. In one or more embodiments, the computer-implemented method includes classifying at most one token in each respective clause of the plurality of clauses as a head of the respective clause; and classifying a given token as a head of a first clause in the hierarchy of clauses when a given coordination token indicates a relationship between the first clause and a second clause and the second clause contains a token identified as the head of the second clause.

In one or more embodiments, the computer-implemented method includes obtaining a dependency tree of the sentence portion based on the dependency information. The dependency tree comprises a sentence head that is a main predicate in the sentence portion and the dependency tree indicates a syntactic relationship of each token in the sentence portion from the sentence head. The associating the any respective connection comprises identifying a main clause of the hierarchy of clauses, using the dependency tree, and a connection between the main clause and another clause in the sentence portion at an adjacent level.

In one or more embodiments, generating the new data set comprises appending the one or more location identifiers to the token data set. In one or more embodiments, the token information further comprises in addition to the dependency information: morphological information of the respective token and part of speech information of the respective token. The morphological information comprises a root form of a token identified in the sentence portion of the text data.

In one or more embodiments, generating the new data set comprises generating, for each token represented in the token information, a main clause identifier indicating whether a clause comprising a respective token is a main clause or a subordinate clause.

In one or more embodiments, the computer-implemented method includes determining a first location of a first clause of the plurality of clauses of the sentence portion by associating a first level of the hierarchy of clauses to the first clause. The computer-implemented method includes determining a second location of a second clause of the plurality of clauses of the sentence portion by associating a second level of the hierarchy of clauses to the second clause. The second level is different from the first level. In one or more embodiments, the computer-implemented method includes determining a path from the determined first location of the first clause in the hierarchy of clauses to the determined second location of the second clause in the hierarchy of clauses. Generating the new data set comprises generating, for respective tokens of the first clause, a clause hierarchy identifier indicating the determined path from the first location of the first clause to the second location of the second clause.

In one or more embodiments, the computer-implemented method includes classifying each token in each respective clause of the plurality of clauses as a head of the respective clause or a member of the respective clause. Generating the new data set comprises generating, for each token represented in the token information, a clause head indicator indicating whether a respective token is classified by the clause analyzer as a head of the respective clause or as a non-head member of the respective clause.

In another example embodiment, a clause analyzer is provided. The clause analyzer includes, but is not limited to, a processor and memory. The memory contains instructions executable by the processor wherein the clause analyzer is configured to receive a clause request, at the clause analyzer, to locate clauses within text data representing information in a human language. The text data comprises a plurality of clauses of a sentence portion. The clause analyzer is configured to generate, responsive to the clause request, a dependency request to a dependency parser to determine dependency information for a plurality of tokens of the plurality of clauses of the sentence portion. Each token of the plurality of tokens comprises one or more characters of the text data, and the dependency information indicates a dependency of a respective token of the sentence portion on at least one other token of the sentence portion. The clause analyzer is configured to receive, responsive to the dependency request, token information in a token data set. The token information comprises one or more token identifiers of identified tokens in the sentence portion of the text data. The token information comprises dependency information indicating a dependency of a respective token of the identified tokens on at least one other token of the sentence portion. The clause analyzer is configured to determine a location for each of the plurality of clauses of the sentence portion in a hierarchy of clauses by associating to each clause in the sentence portion: one of a plurality of levels of the hierarchy of clauses; and any respective connection to a clause associated to a different level of the plurality of levels. The clause analyzer is configured to generate and output a new data set based on the token data set and the hierarchy of clauses. The new data set comprises information representing the token information, and the new data set comprises one or more location identifiers indicating a location of a respective token of the token information according to a location, in the hierarchy of clauses, of a clause comprising the respective token of the token information.

In one or more embodiments, the clause analyzer is configured to implement any of the computer-implemented method or instructions of the computer-program product as described herein.

In another example embodiment, a computer-program product tangibly embodied in a non-transitory machine-readable storage medium is provided. The computer-program product includes instructions operable to cause a human language analyzer to receive, at the human language analyzer, text data representing information in a human language. The text data comprises a plurality of clauses of a sentence portion. The computer-program product includes instructions operable to cause a human language analyzer to obtain a data structure defining a defined hierarchy of clauses. The defined hierarchy of clauses associates each clause of the plurality of clauses of the sentence portion with one of a plurality of levels. The defined hierarchy of clauses defines hierarchy connections between clauses associated with different levels of the plurality of levels. The computer-program product includes instructions operable to cause a human language analyzer to receive, at the human language analyzer, a computer command for identifying a text data component of the text data. The computer command comprises a first operator and at least two requirements for the text data component. The first operator limits computer identification of the text data component to one or more clauses of the sentence portion that collectively satisfy the at least two requirements and are hierarchically-related according to the hierarchy connections of the defined hierarchy of clauses. The computer-program product includes instructions operable to cause a human language analyzer to locate, based on the first operator, two clauses of the sentence portion that are on two different levels of the defined hierarchy of clauses and are hierarchically-related according to the hierarchy connections of the defined hierarchy of clauses. The computer-program product includes instructions operable to cause a human language analyzer to identify that a first requirement of the at least two requirements is met in a first clause of the two clauses and identify that a second requirement of the at least two requirements is met in the first clause or a second clause of the two clauses. The computer-program product includes instructions operable to cause a human language analyzer to, responsive to identifying that the first requirement is met and identifying that the second requirement is met, locate the text data component from one of the two clauses. The computer-program product includes instructions operable to cause a human language analyzer to generate, responsive to the computer command, generated data representing the located text data component by the human language analyzer according to the computer command, and output to an output device the generated data.

In one or more embodiments, the instructions are operable to cause the human language analyzer to implement any of the instructions, methods or operations of the clause analyzer.

In one or more embodiments, the first operator has a modifiable string indicating a distance across respective connections of clauses associated with different levels in the defined hierarchy of clauses. In one or more embodiments, the modifiable string is a numeral n greater than or equal to two. The defined hierarchy of clauses defines one or more continuous levels of clauses based on hierarchy connections of the defined hierarchy of clauses. The modifiable string limits identification of the text data component to clauses that are inclusively within n continuous levels of the one or more continuous levels of clauses. In one or more embodiments, the modifiable string is a numeral that limits identification of the text data component to a clause: that is associated with a level of the plurality of levels that indicates a main clause in the defined hierarchy of clauses; and that satisfies the at least two requirements. In one or more embodiments, the modifiable string is a numeral that limits the identification of the text data component to a clause that is identified as a balanced subordinate clause or a promoted de-ranked subordinate clause by the human language analyzer and that satisfies the at least two requirements.

In one or more embodiments, the first operator is one of a plurality of operators that comprise a second operator that limits identification of the text data component to any clauses that are identified by the human language analyzer as a main clause and that individually satisfies the at least two requirements. The first clause is identified by the human language analyzer as a main clause. The instructions are operable to cause the human language analyzer to extract the text data component responsive to identifying that the second requirement is met in the first clause of the two clauses.

In one or more embodiments, the first operator is one of a plurality of operators that comprise a second operator that limits identification of the text data component to any clauses that: are one of clauses identified by the human language analyzer as either a main clause, a balanced subordinate clause, or a promoted de-ranked subordinate clause; and individually satisfies the at least two requirements.

In one or more embodiments, each clause of the plurality of clauses of the sentence portion of the text data comprises one or more tokens. Each token of the one or more tokens comprises one or more characters of the text data. The defined hierarchy of clauses is defined based on a dependency tree indicating a dependency of a respective token of the sentence portion of the text data on another token of the sentence portion of the text data. In one or more embodiments, the instructions are operable to cause the human language analyzer to identify the text data component based on the computer command, parts of speech of the one or more tokens in the text data, and morphological information of the one or more tokens.

In one or more embodiments, the computer command defines a Boolean relationship between the at least two requirements and the at least two requirements comprise a text string or text concept. The text string defines specific characters in a specific order that must be found in the text data to satisfy a requirement, and the text concept defines a specific concept that a given collection of text data characters must satisfy to satisfy a requirement.

In one or more embodiments, each of the plurality of clauses contain a predicate that is an explicit verb, or an implicit copula combined with an explicit subject.

In one or more embodiments, the instructions are operable to cause the human language analyzer to identify a de-ranked subordinate clause in the sentence portion of the text data. A meaning communicated by the human via the de-ranked subordinate clause is dependent (e.g., heavily) on a respective parent clause in the text data. The instructions are operable to cause the human language analyzer to determine that the de-ranked subordinate clause has a same level in the defined hierarchy of clauses as the respective parent clause in the defined hierarchy of clauses.

In one or more embodiments, the instructions are operable to cause the human language analyzer to identify a balanced subordinate clause in the sentence portion of the text data. A meaning communicated by the human via the balanced subordinate clause is dependent on a respective parent clause in the text data. The instructions are operable to cause the human language analyzer to determine that the balanced subordinate clause has a level adjacent a respective parent clause in the defined hierarchy of clauses.

In one or more embodiments, the instructions are operable to cause the human language analyzer to identify multiple main clauses in a same sentence portion of the text data. The instructions are operable to cause the human language analyzer to determine one clause of the multiple clauses is not hierarchically-related to other clauses of the multiple main clauses in the defined hierarchy of clauses.

In one or more embodiments, the instructions are operable to cause the human language analyzer to identify an interrupted clause in the plurality of clauses is split by an embedded clause in the plurality of clauses such that all or a portion of words of the embedded clause is between words of the interrupted clause.

In one or more embodiments, the text data comprises English language text data.

In one or more embodiments, the instructions are operable to cause the human language analyzer to detect a sentiment for the located text data component indicating and emotion conveyed related to the located text data component, and the generated data is the sentiment.

In one or more embodiments, the instructions are operable to cause the human language analyzer to classify the text data or the located text data component as a first category of predefined possible categories for extracted text. The predefined possible categories are predefined model outcomes for the computer command. The generated data is the first category.

In one or more embodiments, the instructions are operable to cause the human language analyzer to receive the text data by: receiving the text data from user input via a sensor or displayed graphical user interface; receiving the text data from an electronic document located using a displayed graphical user interface; or receiving the text data from a computing device via a programming interface.

In another example embodiment, a computer-implemented method is provided. The method comprises receiving, at a human language analyzer, text data representing information in a human language, the text data comprising a plurality of clauses of a sentence portion. The method comprises obtaining a data structure defining a defined hierarchy of clauses. The defined hierarchy of clauses associates each clause of the plurality of clauses of the sentence portion with one of a plurality of levels. The defined hierarchy of clauses defines hierarchy connections between clauses associated with different levels of the plurality of levels. The method comprises receiving, at the human language analyzer, a computer command for identifying a text data component of the text data. The computer command comprises a first operator and at least two requirements for the text data component. The first operator limits computer identification of the text data component to one or more clauses of the sentence portion that collectively satisfy the at least two requirements and are hierarchically-related according to the hierarchy connections of the defined hierarchy of clauses. The method comprises locating, based on the first operator, two clauses of the sentence portion that are on two different levels of the defined hierarchy of clauses and are hierarchically-related according to the hierarchy connections of the defined hierarchy of clauses. The method comprises identifying that a first requirement of the at least two requirements is met in a first clause of the two clauses. The method comprises identifying that a second requirement of the at least two requirements is met in the first clause or a second clause of the two clauses. The method is responsive to identifying that the first requirement is met and identifying that the second requirement is met, locating the text data component from one of the two clauses. The method comprises generating, responsive to the computer command, generated data representing the located text data component by the human language analyzer according to the computer command; and outputting to an output device the generated data.

In one or more embodiments, the computer-implemented method comprises a method to implement any of the instructions of the computer-program product as described herein.

In one or more embodiments, the first operator has a modifiable string indicating a distance across connections of clauses associated with different levels in the defined hierarchy of clauses.

In one or more embodiments, the first operator is one of a plurality of operators that comprise a second operator that limits identification of the text data component to any clauses that are identified by the human language analyzer as a main clause and that individually satisfies the at least two requirements. The first clause is identified by the human language analyzer as a main clause. The computer-implemented method further comprises extracting the text data component responsive to identifying that the second requirement is met in the first clause of the two clauses.

In one or more embodiments, the first operator is one of a plurality of operators that comprise a second operator that limits identification of the text data component to any clauses that: are one of clauses identified by the human language analyzer as either a main clause, a balanced subordinate clause, or a promoted de-ranked subordinate clause; and individually satisfies the at least two requirements.

In one or more embodiments, each clause of the plurality of clauses of the sentence portion of the text data comprises one or more tokens. Each token of the one or more tokens comprises one or more characters of the text data. The defined hierarchy of clauses is defined based on a dependency tree indicating a dependency of a respective token of the sentence portion of the text data on another token of the sentence portion of the text data.

In one or more embodiments, the computer-implemented method further comprises identifying a de-ranked subordinate clause in the sentence portion of the text data. A meaning communicated by the human via the de-ranked subordinate clause is dependent (e.g., heavily) on a respective parent clause in the text data. The computer-implemented method further comprises determining that the de-ranked subordinate clause has a same level in the defined hierarchy of clauses as the respective parent clause in the defined hierarchy of clauses.

In one or more embodiments, the computer-implemented method further comprises identifying a balanced subordinate clause in the sentence portion of the text data. A meaning communicated by the human via the balanced subordinate clause is dependent on a respective parent clause in the text data. The computer-implemented method further comprises determining that the balanced subordinate clause has a level adjacent a respective parent clause in the defined hierarchy of clauses.

In one or more embodiments, the computer-implemented method further comprises identifying multiple main clauses in a same or different sentence portion of the text data. The computer-implemented method further comprises determining one clause of the multiple clauses is not hierarchically-related to other clauses of the multiple main clauses in the defined hierarchy of clauses.

In one or more embodiments, the computer-implemented method further comprises identifying an interrupted clause in the plurality of split by an embedded clause in the plurality of clauses such that all or a portion of words of the embedded clause is between words of the interrupted clause.

In one or more embodiments, the text data comprises English language text data.

In another example embodiment, a human language analyzer is provided. The human language analyzer includes, but is not limited to, a processor and memory. The memory contains instructions executable by the processor wherein the human language analyzer is configured to receive, at the human language analyzer, text data representing information in a human language. The text data comprises a plurality of clauses of a sentence portion. The human language analyzer is configured to obtain a data structure defining a defined hierarchy of clauses. The defined hierarchy of clauses associates each clause of the plurality of clauses of the sentence portion with one of a plurality of levels. The defined hierarchy of clauses defines hierarchy connections between clauses associated with different levels of the plurality of levels. The human language analyzer is configured to receive, at the human language analyzer, a computer command for identifying a text data component of the text data. The computer command comprises a first operator and at least two requirements for the text data component. The first operator limits computer identification of the text data component to one or more clauses of the sentence portion that collectively satisfy the at least two requirements and are hierarchically-related according to the hierarchy connections of the defined hierarchy of clauses. The human language analyzer is configured to locate, based on the first operator, two clauses of the sentence portion that are on two different levels of the defined hierarchy of clauses and are hierarchically-related according to the hierarchy connections of the defined hierarchy of clauses. The human language analyzer is configured to identify that a first requirement of the at least two requirements is met in a first clause of the two clauses, and identify that a second requirement of the at least two requirements is met in the first clause or a second clause of the two clauses. The human language analyzer is configured to responsive to identifying that the first requirement is met and identifying that the second requirement is met, locate the text data component from one of the two clauses. The human language analyzer is configured to generate, responsive to the computer command, generated data representing the located text data component by the human language analyzer according to the computer command. The human language analyzer is configured to output to an output device the generated data.

In one or more embodiments, the human language analyzer is configured to implement any computer-implemented method or instructions of the computer-program product as described herein.

Other features and aspects of example embodiments are presented below in the Detailed Description when read in connection with the drawings presented with this application.

BRIEF DESCRIPTION OF THE DRAWINGS

FIG. 4 illustrates an example of a hierarchy of clauses and rule with more than two requirements in at least one embodiment.

FIG. 5 illustrates an example of a hierarchy of clauses with multiple levels in at least one embodiment.

FIG. 10 illustrates an example of a data structure in at least one embodiment.

FIG. 11A illustrates an example of a data structure in at least one embodiment.

FIG. 11B illustrates an example of a data structure in at least one embodiment.

DETAILED DESCRIPTION

Figure 1:
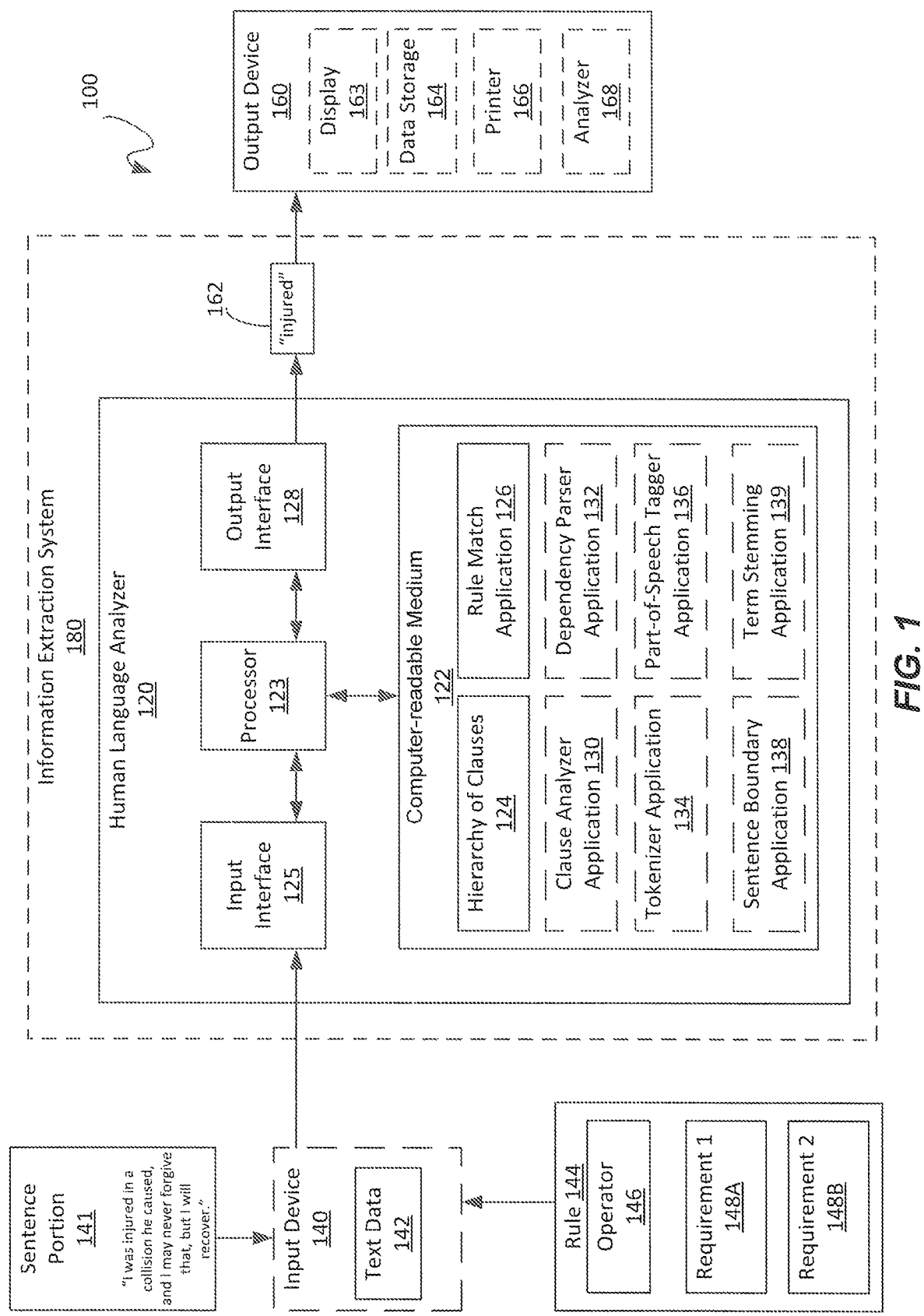
FIG. 1 illustrates an example of a block diagram of a human language analyzer in at least one embodiment.

FIG. 1 shows a block diagram of a system 100 in at least one embodiment. The system 100 includes a human language analyzer 120 and one or more output devices 160. Human language analyzer 120 can be any human language processing device that receives human language input and one or more computer commands (e.g., rule 144) for processing data (e.g., text data 142) representing that human language input (e.g., sentence portion 141). In other words, it is a specialized computing device for processing human language input (e.g., English, Russian, Chinese, and/or Czech language input). For instance, the computing commands comprise rules for interpreting or otherwise identifying components (e.g., text data components) of human language input. Human language input can be unstructured human language (e.g., merely linguistically structured) or semi-structured (e.g., formatted/templatic). The rules and text data can be received by the human language analyzer 120 directly or via one or more input devices 140.

Interpreting or identifying components of human language input is useful in one or more computer applications where it is infeasible or impractical to have human review of human language text. In such cases, a human language analyzer can be a computing device solution for processing human language input to generate data indicating evaluated risk (e.g., in processing large volumes of insurance claims or legal complaints), extracted information (e.g., in extracting information in large data sets), and/or assessed sentiment (e.g., trends in public opinion from social media data, emotions of an author of text data).

In one or more embodiments, the human language analyzer 120 is a component of or comprises components of an information extraction system 180 that provides information or contextual extraction functionality. Alternatively or additionally, the human language analyzer 120 communicates with the information extraction system 180 (e.g., via input interface 125 or output interface 128) and/or an information extraction system 180 is a component of system 100. Examples of information extraction systems and/or human language analyzers provided by SAS Institute, Inc. of Cary N.C. include SAS® Visual Text Analytics, SAS® Contextual Analysis, and SAS® Text Miner of Enterprise Miner™. These systems can employ or use Language Interpretation and Text data Interpretation (LITI) as a rule match application to find matching criteria in response to computer commands related to language and text data interpretation.

The system 100 is configured to exchange information between devices in the system (e.g., via wired and/or wireless transmission). For example, a network (not shown) can connect one or more devices of system 100 to one or more other devices of system 100. In one or more embodiments, the human language analyzer 120 receives text data 142 and rule 144 from one or more input devices 140 via one or more input interfaces 125. For instance, the input device 140 could include one or more of a mouse, a keyboard, a display, a track ball, one or more buttons, a sensor, a phone, a microphone, a scanner, etc. for obtaining the text data 142. Additionally or alternatively, the input device comprises or is data storage (e.g., a file system, a relational database, a system of tables, a structured query language database, a cube distributed across a grid of computers, or in a cloud of computers, etc.). The text data could be generated from text originally produced by a human (e.g., spoken, written, or typed).

In one or more embodiments, the human language analyzer outputs via one or more output interfaces 128 generated data, responsive to the rule 144. For instance, in one or more embodiments, the rule 144 is a rule for identifying a text data component of the text data 142. The rule 144 comprises one or more operators (e.g., operator 146) and one or more requirements (e.g., 148A and 148B). In computer processing, operators include strings of characters that represent or trigger a computing action based on strings of characters forming the one or more requirements. For instance, in one or more embodiments, the operator defines an operator that identifies a text data component based on the scope of a clause, or to multiple hierarchically-related clauses within a sentence portion of text data 142. A sentence portion refers to data representing an entire sentence or a sentence fragment of a sentence. Text data 142 includes one or more sentence portions. A given sentence portion in the text data 142 includes one or more clauses. The one or more clauses may be of the same type (e.g., main clauses) or of different types (e.g., main clauses, balanced subordinate clauses and/or de-ranked subordinate clauses).

In one or more embodiments, the human language analyzer outputs to one or more output devices 160 generated data 162 representing a located text data component by the human language analyzer 120 according to a computer command for identifying one or more text data components of the text data 142. In one or more embodiments, the generated data 162 is the located text data component itself or the text with the located data component (e.g., identification of a document, paragraph, sentence or sentence portion comprising the located data component).

Additionally or alternatively, the generated data 162 is one of predefined possible categories for the data component. For instance, the predefined possible categories could be one or more concept names or labels for the located text component, a sentiment, an evaluation, etc. For instance, in the example of an insurance claim by an insured party generated data 162 could be a found text word "injured" or a concept label ("otherinjured"). Alternatively or additionally, the generated data could be a category (e.g., a category of high risk if the text data component indicates an injury that may require litigation or a high insurance payout). Alternatively or additionally, the generated data could be a sentiment (e.g., how the insured party subjectively feels about an injury or the insurance process).

In one or more embodiments, the one or more output devices 160 are one or more of a display 163, data storage 164, a printer 166 or a further analyzer 168. In one or more embodiments, the one or more output devices 160 output the generated data 162 for review by a user of the output device 160 and/or human language analyzer 120 (e.g., via display 163 and/or printer 166). Additionally, or alternatively, the one or more output devices 160 output the generated data 162 for use by another computing system (e.g., via data storage 164 and/or analyzer 168). For instance, if the text data 142 is related to advertisements for goods or services, the generated data could be key words from those advertisements or reviews regarding the advertisements, etc. A further analyzer could be a computing system for searching advertisements (e.g., Amazon® or eBay®) that is going to then organize or determine search terms for the generated data components.

The human language analyzer 120 has a computer-readable medium 122 and a processor 123. Processor 123 operably couples with components of human language analyzer 120 (e.g., input interface 125, with output interface 128 and with computer readable medium 122) to receive, to send, and to process information. Computer-readable medium 122 is an electronic holding place or storage for information so the information can be accessed by processor 123. Computer-readable medium 122 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

In one or more embodiments, computer-readable medium 122 stores instructions for execution by processor 123 and/or data for operation by these instructions. For example, computer-readable medium 122 comprises data identifying relationships between tokens (e.g., one or more related characters of text data 142) of a sentence portion comprising one or more tokens. For instance, one or more tokens of text data could be related or otherwise grouped based on their association in a same clause of a sentence fragment. Data or instruction storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Processor 123 executes instructions (e.g., stored at the computer readable medium 122). The instructions can be carried out by a special purpose computer, logic circuits, or hardware circuits. In one or more embodiments, processor 123 is implemented in hardware and/or firmware. Processor 123 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 123 in one or more embodiments can retrieve a set of instructions from a permanent memory device and copy the instructions in an executable form to a temporary memory device that is generally some form of RAM, for example. In one or more embodiments, processor 123 also obtains other stored information (e.g., for carrying out instructions).

In one or more embodiments, a given sentence portion of the text data 142 could have multiple clauses. Each clause of the multiple clauses of the sentence portion could comprise one or more tokens where each token of the one or more tokens comprises one or more characters of the text data 142 or is otherwise represented by the text data 142. Stored data for this sentence portion could include a data structure defining a defined hierarchy of clauses 124. A defined hierarchy of clauses associates each clause of the plurality of clauses of the sentence portion with one of a plurality of levels and wherein the defined hierarchy of clauses defines hierarchy connections between clauses associated with different levels of the plurality of levels. For instance, a child clause (e.g., a subordinate clause) may depend on a parent clause (e.g., a main or other subordinate clause) for meaning, and thus, the child is associated with a level subordinate to a parent clause but connected through their child-parent relationship. In this way the defined hierarchy of clauses provides data indicating a hierarchy relationships between groups of tokens.

In one or more embodiments, the computer-readable medium 122 stores instructions for execution by processor 123 for a rule match application 126. In one or more embodiments, the rule match application 126 is used as part of an analysis of the rule 144 to determine if a text component of the text data 142 matches or otherwise satisfies the rule 144. For instance, in one or more embodiments, executing instructions for the rule match application 126 comprises using the stored data of the defined hierarchy of clauses 124. For instance, in one or more embodiments, one or more operators 146 in the rule 144 is for identifying text components in hierarchically related clauses. In this example, in one or more embodiments, the rule match application 126 determines, based on the first operator, two clauses of the sentence portion that are on two different levels of the defined hierarchy of clauses and are hierarchically-related according to the hierarchy connections of the defined hierarchy of clauses. The rule 144 is satisfied when the computing device identifies that a first requirement 148A of the at least two requirements is met in a first clause of the two clauses and identifies that a second requirement 148B of the at least two requirements is met in the first clause or a second clause of the two clauses. The computing device responsive to identifying that the first requirement is met and identifying that the second requirement is met, can then locate the text data component from one of the two clauses.

In one or more embodiment, the hierarchy of clauses 124 and the rule match application 126 are stored in the same computer-readable medium 122. However, in other embodiments, the human language analyzer comprises a system of components and may contain multiple processors and computer-readable mediums (e.g. such that the hierarchy of clauses 124 and rule match application 126 or aspects of the rule match application 126 are implemented separately or by different components.

Further, in one or more embodiments, the human language analyzer 120 comprises other components or other applications in the computer-readable medium 122 for storing instructions or data. For instance, the human language analyzer 120 optionally stores instructions for other applications for analyzing clauses or tokens of the text data (e.g., clause analyzer application 130, dependency parser application 132, tokenizer application 134, part-of-speech tagger application 136, sentence boundary application 138 and term stemming application 139). For instance, clause analyzer application 130 comprises instructions to determine the clauses for the defined hierarchy of clauses 124. Dependency parser application 132 generates or determines dependency relationship between tokens. Tokenizer application 134 generates or determines relationship between characters (e.g., as forming tokens). Part-of-speech tagger application 136 identifies or otherwise tags tokens with information regarding their part of speech in a sentence portion. Sentence boundary application 138 determines separations between sentences within the text data 142. Term stemming application 139 identifies word stems of tokens in a sentence portion (e.g., a root word). Each of these optional applications, will be described in more detail herein.

In one or more embodiments, one or more applications stored on computer-readable medium 122 are implemented in software (e.g., computer-readable and/or computer-executable instructions) stored in computer-readable medium 122 and accessible by processor 123 for execution of the instructions. The applications can be written using one or more programming languages, assembly languages, scripting languages, etc.

One or more applications stored on computer-readable medium 122 can be implemented as a Web application. For example, an application can be configured to receive hypertext data transport protocol (HTTP) responses and to send HTTP requests. The HTTP responses may include web pages such as hypertext data markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text data file, an image file, an audio file, a video file, an executable, a common gateway interface application, a Java applet, an extensible markup language (XML) file, or any other type of file supported by HTTP.

In one or more embodiments, fewer, different, and additional components can be incorporated into human language analyzer 120 (e.g., components for supporting one or more of the applications described herein). As another example, the same interface could support both input interface 125 and output interface 128. For example, a touch screen provides a mechanism for user input and for presentation of output to the user. Alternatively, the input interface 125 has more than one input interface that uses the same or different interface technology. Alternatively or additionally, the output interface 128 has more than one output interface that uses the same or different interface technology.

In one or more embodiments, the system 100 implements a method as described herein (e.g., a method 200 shown in FIG. 2) for outputting generated data 162 representing a located text component according to a rule 144.

Figure 2:
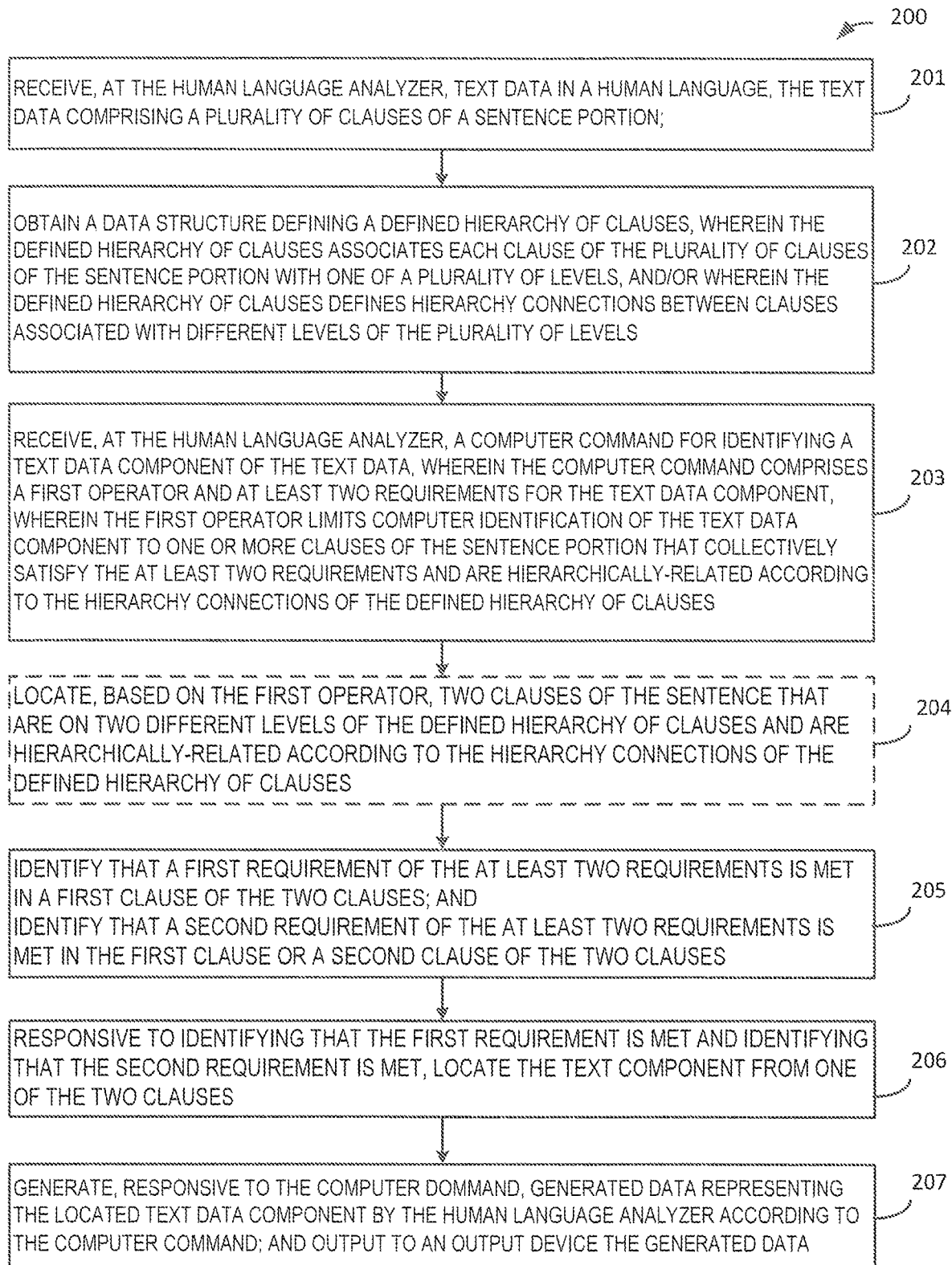
FIG. 2 illustrates an example of a method for a human language analyzer in at least one embodiment.

FIG. 2 illustrates an example flow diagram for a computer-implemented method 200 that can be used to output generated data (e.g., generated data 162) representing a located text component according to a rule (e.g. rule 144). FIG. 2 is described in relation to FIG. 3 which illustrates an example hierarchy of clauses and rule in at least one example. The method could be used with other hierarchies or rules (e.g., in other examples described herein).

It is noted that individual embodiments (e.g., the flow diagram of FIG. 2) may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc.

The method 200 illustrates an operation 201 that includes receiving, at the human language analyzer (e.g., human language analyzer 120), text data representing information in a human language (e.g., text data 142). In this example method, the text data comprises a plurality of clauses of a sentence portion. Embodiments herein are applicable to other text data. For instance, text data could include only a single clause of a single sentence fragment, a single sentence with multiple clauses, and multiple sentences, each with one or more clauses.

A human language analyzer could receive text data in a variety of different ways. In one embodiment, the human language analyzer receives text data from user input (e.g., via a displayed graphical user interface or a sensor). Alternatively or additionally, the human language analyzer receives the text data from an electronic document (e.g., an electronic book or legal document) located using a graphical user interface. Alternatively, or additionally, the human language analyzer receives the text data from a computing device via a programming interface.

Figure 3:
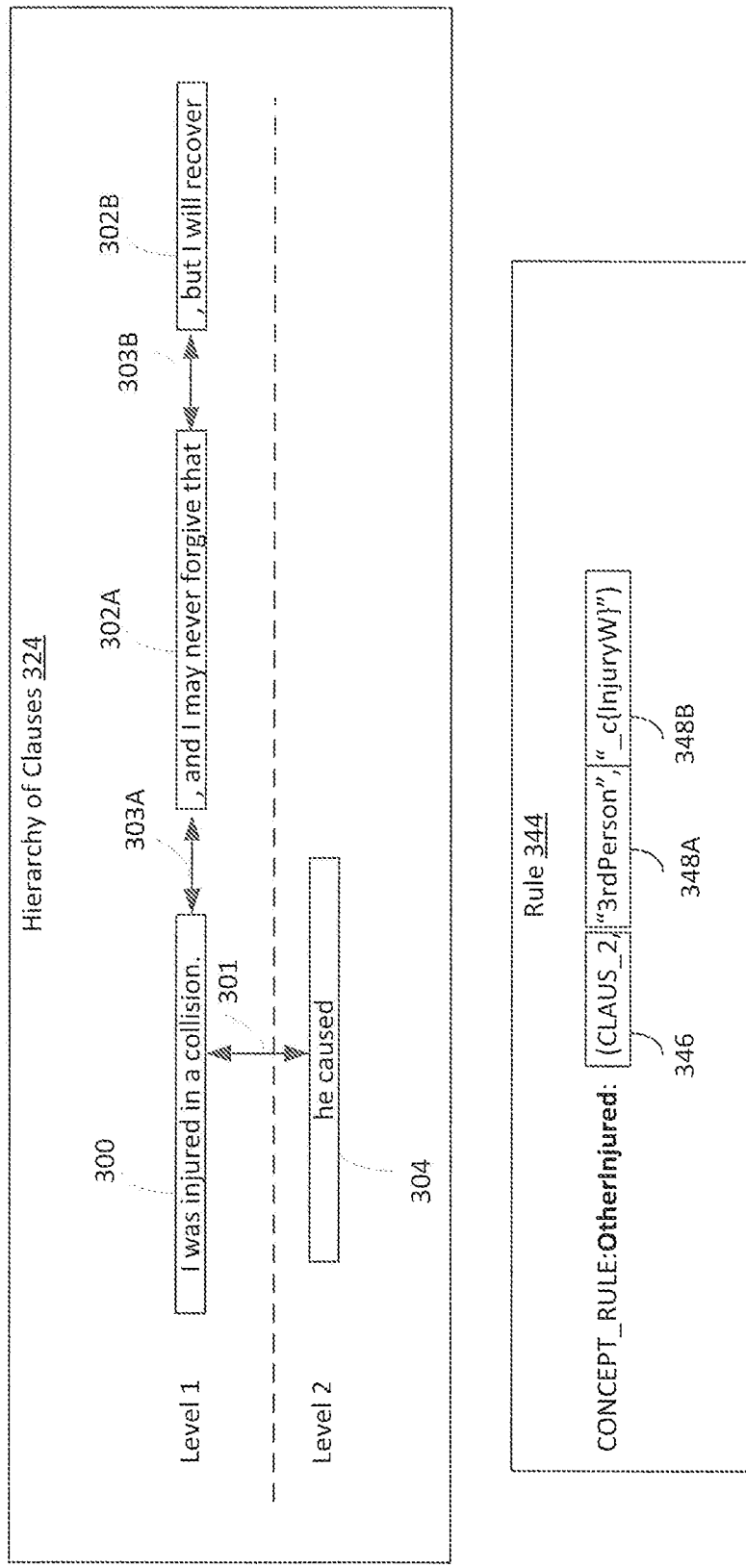
FIG. 3 illustrates an example of a hierarchy of clauses and rule with at least two requirements in at least one embodiment.

The method 200 illustrates an operation 202, that includes obtaining a data structure defining a defined hierarchy of clauses. The defined hierarchy of clauses associates each clause of the plurality of clauses of the sentence portion with one of a plurality of levels. Additionally, or alternatively, the defined hierarchy of clauses defines hierarchy connections between clauses associated with different levels of the plurality of levels. FIG. 3, shows an example hierarchy of clauses 324 for the text data 142. This example hierarchy of clauses comprises two levels.

There are variations in the definition of a clause in the field of linguistics regarding clause boundary identification. For instance, definitions may be categorized as simpler versus more complete. Alternatively or additionally, definitions may vary to account for a particular type of language.

A clause can be considered simply just a "group of words with a verb". Collins. Collins Cobuild English Grammar (2012); see also Orasan, Constantin. A hybrid method for clause splitting in unrestricted English texts (2000). A more complex definition for a clause is a minimum unit of information containing at least a subject and a predicate. Kaalep, Heiki-Jaan; Muischnek, Kadri. Robust clause boundary identification for corpus annotation (2012); see accord Del Corro, Luciano and Gemulla, Rainer. ClausIE: Clause-Based Open Information Extraction (2013) (defining a clause as minimum unit of information containing at least a subject and a verb). An even more complex or complete definition of a clause is a group of words that contain either a predicate that is an explicit verb, or an implicit verb combined with an explicit subject.

Using the word 'predicate' over 'verb' is more accurate and allows for certain verb-less predicates to be considered the core of a clause. For example, in many languages, the copula (be) verb is elided for predicate nominative or predicate adjective expressions. For example, "the water is wet" in Russian translates literally into English as "water wet", but it is still considered to be a sentence with a main clause. Also, sometimes multiple verbs (usually auxiliaries) are chained together to account for aspect, tense, etc. but contain only one main verb. In this case, the verb group or chain is considered to be a single predicate.

The predicate in a clause, may be limited by a language analysts to only finite verbs (or implied finite verbs) or include non-finite types of clauses as well. Some linguists allocate three main structural types of clauses: finite clause, non-finite clause, and verb-less clause. Quirk, Randoph; Greenbaum, Sidney; Leech, Geoffrey; Svartvik, January A Comprehensive Grammar of the English Language (1985). In English, finite verbs include verbs that indicate subject-verb agreement by the form of the verb itself. Non-finite verbs include infinitive or participial forms. Verb-less clauses do not contain an overt verb, but usually imply a missing copular verb.

Clauses can also have different types based on their relationship to other clauses. For instance, clauses may be main (or independent) clauses that form a complete sentence if read alone, or clauses may be subordinate or dependent clauses that depend on another clause for meaning. Main (or independent) clauses in English usually require a finite verb to be present or implied (as in the predicates described earlier). Predicates that occur in subordinate clauses may be either finite or nonfinite in English. Subordinate (or dependent) clauses can be classed into different groups (e.g., based upon the closeness of the ties of information in the clause to its parent). Subordinate clauses that contain a verbal form that mirrors those of independent clauses are associated or otherwise grouped as balanced (or here also strong) subordinate clauses. They generally have or imply a finite verb form in English. Subordinate clauses that have or imply a verb (like the nonfinite verb forms in English) that is different from those in independent clauses are considered to be more tightly tied to their parent clause, and are associated or otherwise grouped with de-ranked (or here also weak) subordinate clauses.

One or more embodiments herein, can identify a clause that contains a subject and a predicate, and where the subject may be omitted or the verb may be implied. Other embodiments include identification of clauses using simpler or more complex definitions. One or more embodiments herein also distinguish or identify boundaries between clauses of different types. In one or more embodiments, at least three types of clauses can be detected for definition in the hierarchy of clauses: main, balanced subordinate (also called strong subordinate) (e.g., adverbial, nominal, and relative clauses), and de-ranked subordinate (also called weak subordinate) (e.g., infinitival, small, and participial/gerundial clauses). There are also boundaries between main clauses and their dependent subordinating clauses. FIG. 3 shows an identified main clause 300 and a subordinate (balanced) clause 304. Parent-child relationships or connection 301 can be defined between these clauses, which associates the different clauses with one of different levels in the hierarchy and defines a boundary between the clauses.

There are also boundaries between main clauses, which could stand alone as sentences, and other main clauses in a coordination relationship. Optionally or additionally, coordinate relationships or connections 303 can be defined between clauses of a same level (e.g., other main clauses 302). Such coordination relationships are usually marked by a coordinating conjunction in English. Therefore, there may be more than one main clause per sentence separated by a boundary that may be marked by a conjunction and/or punctuation. Main clauses, may be in a hierarchical relationship with subordinate clauses, but are not in a hierarchical relationship with each other, rather they are sister clauses.

This example hierarchy of clauses only has two levels. Sentence portions could also have multiple levels of clauses. For instance, there are boundaries between subordinate clauses and their dependent subordinate clauses. Subordinate clauses may also have coordination relationships, sharing the same parent clause and connector word in their parent clause. Note that boundaries of the beginning of a subordinate clause may occur internally to a parent clause, splitting that parent clause into multiple pieces. Reconstituting such divided clause fragments into a full clause is one of the biggest challenges in clause identification. One or more embodiments herein, overcome this challenge of handling embedded clauses (e.g., by leveraging a dependency parsing tree sentence as will be described in more detail herein).

In one or more embodiments, a defined hierarchy of clauses indicates one or more of boundaries between clauses, clause types, connections between clauses, levels or depths of clauses from a top-level main clause. Embodiments are not limited in associating levels strictly based on clause type, and an associated level may also be augmented by the human language analyzer for other reasons (e.g., a balanced subordinate clause may be at a level below a main clause and may be promoted to a higher level, or a de-ranked subordinate clause may be at a same level as a main clause and be demoted to a lower level).

The method 200 illustrates an operation 203, that includes receiving, at the human language analyzer, a computer command (e.g., a rule) for identifying a text data component of the text data. Natural language processing (NLP) has many different types of rules for identifying a text data component of text data. For instance LITI rules have rules of type CONCEPT_RULE, PREDICATE_RULE, SEQUENCE, etc). Rules can define various operators and arguments. U.S. Pat. No. 9,460,071 assigned to SAS Institute Inc., of Cary, N.C. includes example of rules for NLP and known operators and requirements and their syntax form.

For instance, CONCEPT_RULE and PREDICATE_RULE types allow for the use of operators in a syntax that places the operator along with its arguments in a comma-separated list within parentheses. Here is an example:

CONCEPT_RULE:(AND, "peace", "_c{nlpPerson}")

This rule says to match both the word 'peace' and mention of a person's name, if they appear together in a document. The person's name will be extracted, because it is marked with an underscore label in the rule. The difference between the two rule types is that CONCEPT_RULE rules can only extract one thing from the match, but PREDICATE_RULE rules can extract multiple things.

Common operators for rules (e.g., of type CONCEPT_RULE and PREDICATE_RULE) for instance include Boolean operators (e.g., AND, OR). An AND operator specifies a match when all arguments following the operator are present. An OR operator specifies a match when any of the arguments following the operator are present. For instance, a rule form of type "CONCEPT_RULE" is shown below with the operator "AND" and arguments "_c{Bills}" and "football".

CONCEPT_RULE: (AND, "_c{Bills}", "football")

PREDICATE_RULE AND CONCEPT_RULE rule types also use operators to specify proximity relationships between text data components.

An argument governed by an operator may be a string (one or more consecutive tokens), a reference to another concept (and all of its rules), or a representative label for a token (like a POS tag), or any combination of the three. Also, an argument may be another operator and its arguments-operators may be embedded in the rule under other operators.

Other common types of an operator are operators for specifying an allowed distance or relationship between found arguments. For instance, a SENT operator matches when all arguments are found in the scope of a sentence. The ORD operator matches like AND but requires the arguments to be present in the text in the order specified. The DIST_n operator matches all arguments within n tokens of each other.

For instance, a rule form of type "PREDICATE RULE" is shown below with the operator DIST_20 and arguments "_drug{DrugName}" "_manufacturer{Drug Company}" and "make" indicating the words must be within 20 tokens of each other:

PREDICATE_RULE:(drugmanufacturer): (DIST_20, "_ drug{DrugName}", "_manufacturer{Drug Company}", "make")

In one or more embodiments, one or more new operators are defined that are useful for rule types for NLP that use operators (e.g., CONCEPT_RULE or PREDICATE_RULE rule types define herein and in U.S. Pat. No. 9,460,071 or other rules for information extraction in NLP). As an example, a new operator of CLAUS_n is defined, where n may be a value from zero to any positive integer. This operator will help users to limit matches for their rules to the scope of a clause, or to a series of hierarchically adjacent clauses within a sentence. The operator comprises a modifiable string (e.g., "n") indicating a distance across connections of clauses associated with different levels in the hierarchy of clauses. For instance, a new operator described herein in a CONCEPT_RULE type:

CONCEPT_RULE:(CLAUS_1, "FirstPart", "_c{SecondPart}")

In operation 203, the received computer command comprises a first operator (e.g., CLAUS_n operator) and at least two requirements for the text data component. The first operator limits computer identification of the text data component to one or more clauses of the sentence portion that collectively satisfy one or more requirements and are hierarchically-related according to the hierarchy connections of the defined hierarchy of clauses.

In one or more embodiments, the operator limits the identification based on or responsive to a modifiable string of the operator. For instance, the operator may have a numeral n greater than or equal to two. The defined hierarchy of clauses defines one or more continuous levels of clauses based on hierarchy connections of the defined hierarchy of clauses and the modifiable string limits identification of the text data component to clauses that are inclusively within n continuous levels of the one or more continuous levels of clauses.

FIG. 3 shows an example rule 344 with an operator 346. This operator has a "2" indicating that the arguments or requirements can be met in a first or second clause that are the same clause or on two different levels that have a hierarchical relationship of depth 2. In other words, a hierarchical relationship of depth 2 are exemplified by clauses of two adjacent or continuous levels inclusively (i.e. clause 300 and clause 304).

It should be appreciated that operations 201-203 of method 200 could be implemented in any order and/or concurrently. The method 200 also illustrates an optional operation 204, that includes locating, based on the first operator, two clauses of the sentence portion that are on two different levels of the defined hierarchy of clauses and are hierarchically-related according to the hierarchy connections of the defined hierarchy of clauses. In this example, only clauses 300 and clause 304 are hierarchically-related according to the hierarchy connection 301. Clauses 300 and 302 have coordinating connections 303, which indicates they are different clauses but not hierarchically related.

Whether operation 204 is implemented may be dependent on a modifiable string of an operator. For instance, if the operator has a modifiable string that indicates the requirement can be met in more than one clause (e.g., CLAUS_n, where n is a numeral greater than or equal to two), in an operation 204, a defined hierarchy of clauses may be determined to find clauses that are hierarchically related. For example, a defined hierarchy of clauses may have one or more continuous levels of clauses based on hierarchy connections of the defined hierarchy of clauses) and the modifiable string limits identification of the text data component to clauses that are inclusively within n continuous levels of the one or more continuous levels of clauses.

In one or more embodiments, the determining of a defined hierarchy comprises accessing stored information related to the defined hierarchy of clauses. This information could be generated preemptively in preparation for receiving a rule type or in response to receiving a particular rule type (e.g., one that allow for matches across levels).

In one example, the modifiable string is a numeral that limits identification of the text data component to a clause that is at a level of the plurality of levels that indicates a main clause in the defined hierarchy of clauses, and that satisfies one or more requirements. For instance, an operator with one type of string (e.g., CLAUS_0) will only target matches with requirements met within the same main clause. As shown in FIG. 3, all the main clauses 300 and 302 are associated with a level 1 of the plurality of clauses.

As another example, a modifiable string could be a numeral that limits the identification of the text data component to a clause that is identified as one or more of a main, balanced subordinate clause or a promoted de-ranked subordinate clause by the human language analyzer and that satisfies one or more requirements. For instance, an operator with a different type of string (e.g., CLAUS_1) will only target matches with requirements met within the same clause, for instance, a main clause, balanced subordinate clause and/or promoted de-ranked subordinate clause. In either of these causes, based on the first operator, it may not be necessary for the human language analyzer to determine two clauses of the sentence portion that are on two different levels of the defined hierarchy of clauses and are hierarchically-related.

Alternatively or additionally, whether operation 204 is implemented may be dependent on a selected operator. For instance, a user may be provided with a set of multiple possible operators (e.g., CLAUS_0, CLAUS_1, OR CLAUSE_n). If an operator is selected in which the requirements can be satisfied across multiple clauses (e.g., CLAUSE_n) operation 204 could be implemented. Alternatively, an operator could be selected in which the requirements have to be satisfied in a single claim, then a clause hierarchy may not be determined. For instance, one operator (e.g., CLAUS_0) of the set can be an operator that limits identification of the text data component to any clauses that are identified by the human language analyzer as a main clause and that individually satisfies requirements of the rule. A different operator (e.g., CLAUS_1) of the set can be an operator that limits identification of the text data component to any clauses that are one of clauses identified by the human language analyzer as either a main clause, a balanced subordinate clause, and/or a promoted de-ranked subordinate clause and individually satisfies requirements of the rule.

In an operation 205, the requirements are identified. In one or more embodiments, the received rule has at least two requirements that must be met to satisfy the rule. For instance, it is identified that a first requirement of the at least two requirement is met in a first clause and that a second requirement of the at least two requirements is met in the first clause or in a second clause.

In the example shown in FIG. 3, the first requirement or argument 208A was a 3rd person pronoun (e.g., "he" or "she"). This word was found in clause 304. The second requirement or argument 208B is a word marked for extraction ("_c") related to an injury (e.g., "injured" or "injury") and this word was found in clause 300. The second requirement is also an extraction requirement or operation to extract the word related to the injury.

The method 200 illustrates an operation 206, that includes responsive to identifying that the first requirement is met and identifying that the second requirement is met, locating the text data component from one of the two clauses. In the example, the text data component could be a word actually found in the text data (e.g., "injured") or a concept in the text data related to the located text data component (e.g., "otherinjured").

In one or more embodiments, the human language analyzer identifies the text data component based on the rule, parts of speech of the one or more tokens in the text data and/or morphological information of the one or more tokens. For instance, parts of speech include whether for instance a token or word is a pronoun, verb, adverb, preposition, punctuation, conjunction, noun, etc. In this case, the 3rd person word requirement required recognition of a pronoun. Morphology information would include for instance lemma or root word. In this case, the requirement to look for a word related to an injury may search for tags with a root word like injure and find injured. Morphology information may be limited to inflectional morphology and not derivational. In this case, an item like injure@V in a rule would match injure and injured (inflected forms of the verb injure), but not injury, which is a noun derived from injure.

The method 200 illustrates an operation 207, that includes generating, responsive to the computer command, generated data representing the located text data component by the human language analyzer according to the computer command. In one or more embodiments, the generated data is the located text data component or concept or the text with the located data component. As one example, a PREDICATE_RULE type returns the text between the arguments of the rule. For example, PREDICATE_RULE:pred(arg1, arg2):(CLAUS_1, "_arg1{injured}", "_arg2{collision}") would return "injured in a collision" as a match for the input sentence "I was injured in a collision."

Additionally, or alternatively, the operation 207 causes the human language analyzer to detect a sentiment for the located text data component indicating an emotion conveyed related to the located text data component. The generated data could be the sentiment. For instance, a sentiment in the text data in FIG. 3 could be an emotion of blame or anger at another party. Additionally or alternatively, the generated data could include a sentiment label and extracted text data to highlight the reason for the sentiment label. The label may optionally be associated with another label to indicate what is being assessed. For example, rather than just a label of "negSentiment" as in simple, document-level sentiment, one could model and extract additional information to explain why a customer's use of a product in a customer review exhibited a negative sentiment like: featureUsability and "text data was too small".

Sentiment analysis is useful for understanding the nuances of human communication beyond the literal words. A text data component's location within a clause and its relationship to other clauses can also be used to detect sentiment conveyed (e.g., based on whether words associated with blame are in a main clause in the sentence or in a dependent). The generated data is output to an output device (e.g., output device 160).

Additionally, or alternatively, the operation 207 causes the human language analyzer to classify the text data or the located text data component as a first category of predefined possible categories for extracted text. For instance, the predefined possible categories are predefined model outcomes for the rule and the generated data is a given category of the possible categories. A given model could have more than one rule per model.

For instance, if an extraction or categorization model is used to assess risk in a legal claim, predefined user category may be, for instance, high litigation risk for a claim, potential litigation risk for a claim, low litigation risk for a claim, etc. The human language analyzer may then output an indication of risk, and/or associate a text data in a category of text data indicating a particular risk. Alternatively or additionally, generated data is used to identify an injured party (e.g., extract who that person is or how they are described) and/or categorize a document on an importance level (e.g. containing facts related to a legal claim).

As another example, if a vehicle manufacturer wanted to know what was going wrong with their vehicles based on customer complaints, an extraction model could have a part (Concept1) and an issue (Concept2) and then extract related parts and issues as a problem (Fact) from the customer complaints text data. The extracted text could then be used to categorize problems by part or by issue for reporting or investigation purposes. For example, a report could include a graph showing the problems with seat belts.

The method of FIG. 2 was described with an example of a rule with only two requirements, however it is equally applicable to a rule with more than two requirements or for rules for identifying more than one data component in a text.

FIG. 4 illustrates a rule with more than two requirements in at least one embodiment applied to a sentence with the same hierarchy of clauses 324. The rule 444 has four different requirements 448 that must be found within a same clause or on two different levels that are hierarchically related.

In this case, the human language analyzer (e.g., human language analyzer 120) would not find a match. Clauses 300, 302A and 302B each contain a first person word "I" according to the requirement 448A. Clauses 302A contains a modal verb "may" according to the requirement 448B and a negative word "never" according to the requirement 448C. However, clause 302A does not contain a recovery word according to the requirement 448D. Clause 302B does contain a recovery word "recover" according to the requirement 448D. However, the rule will not return a match because these are in clauses that are not hierarchically-related. They are associated with a same level and are merely related by a coordinating connection 303B.

In a situation in which the human language analyzer does not find a match, generated data could indicate no match was found on one of predefined categories associated with no match (e.g., putting a document containing the text in a category of low risk).

Hierarchy of Clauses 324 is given as a simple example with only two levels and only one hierarchy path between levels defined by the connection 301. One of ordinary skill of the art will appreciate a defined hierarchy of clauses could contain more than two levels and multiple hierarchy paths.

FIG. 5 illustrates a hierarchy of clauses 524 in at least one embodiment for text data representing a text sentence 542.

In one or more embodiments, a human language analyzer (e.g., human language analyzer 120) identifies multiple main clauses in a sentence portion of the text data (e.g., main clause 564, main clause 572, and main clause 580). The human language analyzer determines one clause of the multiple clauses is not hierarchically-related to other clauses of the multiple main clauses in the defined hierarchy of clauses. For instance, as shown in FIG. 5 each of the main clauses 564, 572 and 580 are not hierarchically related. By defining different coordinating and parent-child relationship connections as described herein different hierarchy paths are defined. Hierarchy path 550A comprises three levels with subordinate clause 560 dependent on subordinate clause 562 and subordinate clause 562 dependent on main clause 564. Hierarchy path 550B comprises two levels with balanced subordinate clause 570 dependent on main clause 580. Main clause 572 is not in a hierarchy path.

In one or more embodiments, a human language analyzer (e.g., human language analyzer 120) identifies a subordinate clause (e.g., de-ranked subordinate clause 568 or balanced subordinate clause 562) in the sentence portion of the text data. A meaning communicated by a human via a subordinate clause is dependent on a respective parent clause in the text data.

In one or more embodiments, the human language analyzer determine that the de-ranked subordinate clause has a same level in the defined hierarchy of clauses as the respective parent clause in the defined hierarchy of clauses. For instance as shown in FIG. 5, there is a de-ranked subordinate clause 568 at the same level as main clause 564. A parent-child connection 590 establishes the relationship between main clause 564 and de-ranked subordinate clause 568, but they are both associated with a same level. In other words the de-ranked subordinate clause 568 is then treated as a part of the parent main clause 564. The boundary between the main clause 564 and the de-ranked subordinate clause 568 can or cannot then be ignored by the human language analyzer depending on the implementation. The placement of the de-ranked subordinate clause 568 in the hierarchy path 550A is defined by its parent main clause 564. In the example shown in FIG. 5, the de-ranked subordinate clause 568 is at a same level as parent clause 564. Additionally, or alternatively, the de-ranked subordinate clause 568 can be promoted in an action 566 to be on a different level than its parent main clause 564. If action 566 is implemented, de-ranked subordinate clause is a promoted de-ranked subordinate clause.

In one or more embodiments, a human language analyzer (e.g., human language analyzer 120) identifies a balanced subordinate clause (e.g., balanced subordinate clauses 562, 560 and 570) in the sentence portion of the text data. The human language analyzer determines that the balanced subordinate clause has a level adjacent to a respective parent clause in the defined hierarchy of clauses. For instance as shown in FIG. 5, there is a balanced subordinate clause 562 at a level below main clause 564.

A parent-child connection 592A establishes the parent-child relationship between main clause 564 and balanced clause 562 and they are associated with different levels. The parent-child connection 592B establishes the parent-child relationship between balanced subordinate clause 560 and balanced subordinate clause 562. Thus, clause 560 can be considered the grandchild of clause 564 in the defined hierarchy of clauses 524. The connections 592 define a hierarchy path 550A between the grandparent level 1 (main clause 564 and de-ranked subordinate clause 568), parent level 2 (balanced subordinate clause 562), and the child level 3 (balanced subordinate clause 560).

In one or more embodiments, a human language analyzer (e.g., human language analyzer 120) identifies an interrupted clause that is split by an embedded clause such that all or a portion of words of the embedded clause is between words of the interrupted clause. For instance, as shown in FIG. 5, balanced subordinate clause 570 interrupts split clause 580 in the text sentence 542. However, the defined hierarchy of clauses can reconstruct the interrupted or split clause 580 such that the entire clause is accounted for independently of the embedded balanced subordinate clause 570 (e.g., in determining a level for each clause in the hierarchy). The balanced subordinate clause 570 is then associated with a level based on a parent-child relationship connection 594 to its parent clause main clause 580. In the example shown in FIG. 5, the balanced subordinate clause 570 is a level below the parent clause 580. Additionally, or alternatively balanced subordinate clause 570 is demoted in an action 574 to be on a same level as the parent clause 580. If action 574 is implemented, balanced subordinate clause 570 is a demoted balanced subordinate clause. Embodiments herein are equally applicable to other types of embedded or interrupted clauses (e.g., deranked subordinate clause 568).

One or more embodiments improve clause detection, for instance, by detecting clauses (subject/predicate pairs with finite or non-finite verbs) in a sentence and/or by detecting split or interrupted clauses (e.g., because clauses can be defined as subtrees of a dependency tree). Additionally, or alternatively, one or more embodiments, improve clause detection by improving identification of clause relationships (e.g., identify hierarchy and connector words).

In one or more embodiments, one or more new operators are defined for use of clause detection techniques described herein. For instance, the CLAUS_n operator may replace the n with zero or any positive integer, just like DIST_n does. Example operators and rules described below are given merely as example operators and rules and should not be construed as limiting operators and rules described elsewhere.

CLAUS_0 will match all arguments only if they appear within the same main clause.

CLAUS_1 will match all arguments if they appear within the bounds of any one balanced clause, main clause or promoted de-ranked clause.

CLAUS_2 will match all arguments if they appear either in the same clause or across any two hierarchically adjacent clauses.

CLAUS_3 will match all arguments if they appear in the same clause or across any two or three hierarchically adjacent clauses.

The behavior continues in this fashion with each additional integer increment. More details and examples of how a user can utilize the operator in a rule are show below for each of these operators.

The new operator, CLAUS_0, will match when all arguments are found together within the same main clause. The match cannot occur across multiple main clauses within the same sentence (e.g., across coordinating conjunctions).

It is clear to most speakers of English that main clauses do most of the work of carrying the main idea in a sentence. Therefore, main clauses may be considered important in for instance extraction models. There are exceptions, of course, but this is a general tendency in most simple text types. If an information extraction model can target only main clauses (e.g. using a CLAUS_0 operator), then it can eliminate some amount of noise from the matches, assuming the data aligns with this basic assumption (e.g., simple sentence structures, where subordinate clauses are mostly clarifying in nature and do not tend to contain important propositional content). Note, that the model builder should test their data before relying on this assumption.

Example of a sentence with multiple main clauses (bolded): Because we have had in the past a pretty good relationship with Company C in Nashville // and because we still have a service maintenance agreement with them // we do not want to jeopardize our relationship with them II but this verbal misrepresentation // (if it's common with other customers) // and the overcharging ought to be reported.

Example of a rule that operates over both main clauses and identifies the underlined material above:

PREDICATE_RULE:(first,second):(SENT, (CLAUS_0, "_first{VerbGroup}"), (CLAUS_0, "but", "_second{VerbGroup}"))

This rule leverages the CLAUS_0 operator to look for the verbal group in each main clause, separated by the word "but", which occurs as part of the second main clause. This rule demonstrates one way to write a rule that matches across sister clauses related by coordination.

The new operator, CLAUS_1, will match when all arguments are found together within the same clause. The clause may be either a main clause or a strong subordinate clause. Weak subordinate clauses are included with their parent, and do not stand alone as a clause, therefore a match using this operator will target any content from the strong clause and any of its children that are weak clauses.

Example of a sentence with two main clauses (bolded) (second one is split by a subordinate clause) and some subordinate clauses off each main clause: Because we have had in the past a pretty good relationship with Company C in Nashville // and because we still have a service maintenance agreement with them // we do not want to jeopardize our relationship with them II but this verbal misrepresentation // (if it's common with other customers) // and the overcharging ought to be reported.

Example of a rule that operates over both subordinate clauses with 'since' and identifies the underlined material above:

PREDICATE_RULE:(cause,result):(CLAUS_2, (CLAUS_1, "because", (OR, "_cause{nlpNounGroup}", "_cause{Predef}")), (CLAUS_0, "_result{VerbGroup}"))

In this rule, the CLAUS_1 operator ensures that the word "because" and the possible nominal causes are found in the same clause.

The new operator, CLAUS_2, will match when all arguments are found together within the same 2 hierarchically adjacent clauses—they must be in a parent-child relationship with each other. The highest level clause in the match may be either a main clause or a subordinate clause. Weak subordinate clauses are included with their parent, and do not stand alone as a clause, therefore, they are not counted as a level of subordination.

The match may not skip levels—the match between two clauses, may not skip a clause between them. In other words, a CLAUS_2 match will not match a parent and grandchild in the hierarchy, while skipping the child. In order to make that match work, the rule includes the operator CLAUS_3, which will match across 3 hierarchically-adjacent clauses in parent-child relationships with each other. In other words, the n in the operator determines how many main or strong subordinate clauses to match across in a chain of clauses, without skipping any links in the chain.

The same behavior is expected from CLAUS_4, CLAUS_5, etc. The likelihood of sentences going beyond 8 levels is very low, but the integer could be defined higher (e.g., 10).

Example of sentence (main clause bolded) with match across two clause levels for an application to detect a problem with parts (problem and related parts are underlined): However it appeared // that the cracking could have started on the driver side of the window // where one of the fuse boxes is located.

PREDICATE_RULE:(prob, part):(CLAUS_2, "_prob{IssueWord}", "_part{PartWord}")

Note that the main clause is not involved in the match. Two related subordinated clauses are matched using the CLAUS_2 operator.

Example of sentence with matches across three clause levels (with main clauses bolded) and dependency relationships to other clauses marked with numbers in the front and end of the sentence.

1 The joint investigations of linguistics and psychiatry have established, in point of fact, [[2]].
  2 (S): that [[3]] [[4]] it is impossible for people to talk at all [[5]]
    3 (S): no matter what the subject of conversation is
    4 (S): or what words are involved
    5 (S): without telling over and over again [[6]] [[7]]
      6 (S): what sort of people they are
      7 (S): and how they relate to the rest of the world.

This is an example rule that will match from the main clause all the way to the seventh clause through the fifth and fourth clauses:

PREDICATE_RULE:(phrase):(CLAUS_4, "_phrase{investigations of linguistics}", "world")

Figure 6A:
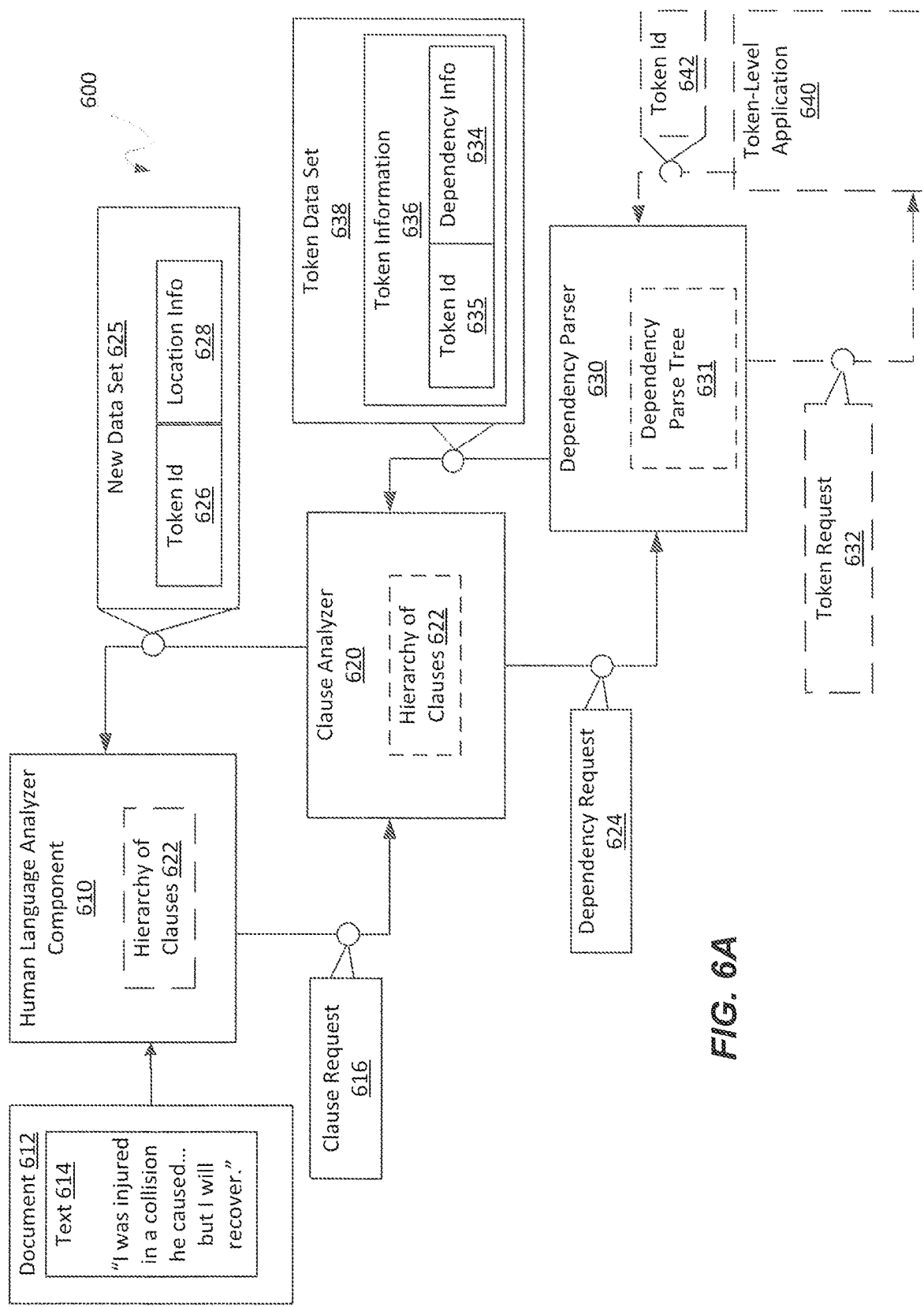
FIG. 6A illustrates an example system comprising a human language analyzer and a clause analyzer in at least one embodiment.

FIG. 6A illustrates an example system 600 comprising a human language analyzer component 610 (e.g., a component of or human language analyzer 120), a clause analyzer 620, a dependency parser 630, and/or a token-level application 640 in at least one embodiment. One or more embodiments leverage key information in a dependency parse (e.g., dependency parser 630) to (1) identify clause boundaries; (2) detect clause types (e.g., main clauses and subordinate clauses); (3) distinguish between robust types of subordinate clauses (balanced) vs. weaker types (de-ranked); (4) identify parent/child clause relationships and the boundaries between them; and/or (5) identify connector terms between parent and child clauses as described herein.

In one or more embodiments, the clause analyzer 620 and dependency parser 630 are applications of the human language analyzer component 610 (e.g., clause analyzer application 130, dependency parser application 132, tokenizer application 134). Alternatively, in embodiments the clause analyzer 620, dependency parser 630, and/or token-level application 640 is implemented separately from the human language analyzer component 610.

The human language analyzer component 610 receives a document 612 that includes text 614 to determine text data (e.g. text data 142). For instance, the document is input in the form of a text string and an empty table (e.g., a XDBTABLE). In one or more embodiments, the text string represents information in a human language (e.g. English, Russian, Chinese, or Czech). In alternative embodiments, the human language analyzer component 610 receives the text data in alternative ways or forms described herein (e.g., via a sensor).

In one or more embodiments, the human language analyzer component 610 sends a clause request 616 to clause analyzer 620 to request clause detection and/or other information for the text 614 (or text data). In one or more embodiments, the clause analyzer 620 receives a clause request 616 requesting the clause analyzer 620 to locate clauses within a text 614 in a human language. The text 614 comprises a plurality of clauses of a sentence portion.

In one or more embodiments, in response to the clause request 616, the clause analyzer 620 generates and/or sends a dependency request 624 to a dependency parser 630. For instance, the dependency request is a request to determine dependency information for a plurality of tokens of the plurality of clauses of the sentence portion of text 614. Each token of the plurality of tokens comprises one or more characters of the text 614. The dependency information indicates a dependency of a respective token of the sentence portion on at least one other token of the sentence portion. One or more tokens of the sentence portion may not be dependent on another token of the sentence portion. For instance, a head word of a sentence has a "root" dependency relation and is dependent on a "ROOT" node in the dependency tree with respect to the sentence.

In response to the dependency request, the dependency parser 630 sends a token request 632 to one or more token-level applications 640 for token-level information (e.g., a tokenizer application 134, a part-of-speech tagger application 136, a term stemming application 139). In one or more embodiments, the dependency parser 630 comprises the one or more token-level applications 640 or one or more token-level applications 640 are implemented separate from the dependency parser 630.

In one or more embodiments, the token-level application 640 sends or otherwise provides to the dependency parser (e.g., in data storage) token identifying information 642 (e.g., token identifier, part of speech information or tags, morphological information) for one or more tokens identified in the sentence portion of the text. In one or more embodiments, the token identifying information is in a token data set.

In one or more embodiments, the dependency parser 630 derives dependency information 634 (e.g., for a dependency parse tree 631).

In one or more embodiments, the dependency parser 630 sends or otherwise provides a token data set 638 comprising token information 636 (e.g., the dependency information 634 and token identifying information 635). In one or more embodiments, token identifying information 635 is the same or different than token identifying information 642.

In one or more embodiments, the clause analyzer 620 receives, responsive to the dependency request 624, token information 636 in a token data set 638. The token information 636 includes one or more token identifiers of identified tokens in the sentence portion of the text. Additionally or alternatively, the token information includes, for one or more of the identified tokens, dependency information indicating a dependency of a respective token of the identified tokens on at least one other token of the sentence portion.

In one or more embodiments, the clause analyzer 620 determines location information 628 for one or more clauses of the sentence portion. For instance, the clause analyzer 620 determines location information 628 by generating or otherwise determining a hierarchy of clauses 622 as described herein (e.g., hierarchy of clauses 124, 324, or 524). For instance, the hierarchy of clauses 622 is generated by associating to each clause in the sentence portion one of a plurality of levels of the hierarchy of clauses and any respective connection to a clause associated to a different level of the plurality of levels. Additionally or alternatively, the clause analyzer detects that a clause of the text 614 is an interrupted clause. An interrupted clause has all or a portion of words of an embedded clause of the plurality of clauses between words of the interrupted clause. The clause analyzer determines a location for the embedded clause and the interrupted clause in the hierarchy of clauses by associating different levels of the plurality of levels of the hierarchy of clauses to the embedded clause and the interrupted clause. For instance, the clause analyzer determines the location of the embedded clause based on a clause type of the embedded clause (e.g., a main clause, a balanced subordinate clause, and a de-ranked subordinate clause) as described herein.

In one or more embodiments, the clause analyzer 620 generates a new data set 625 based on the token identifying information 626 (e.g., token identifying information 635) and/or location information 628 (e.g. relating to hierarchy of clauses 622). For instance, the new data set 625 includes token identifying information 626 representing token information. Additionally or alternatively, the new data set 625 includes one or more location identifiers indicating a location of a respective token of the token information according to a location, in the hierarchy of clauses, of a clause comprising the respective token of the token information. For instance, location identifiers could include, but are not limited to, an identifier indicating whether a clause is a main clause and/or an identifier of a clause path.

In one or more embodiments, the clause analyzer 620 outputs the new data set 625, as for example, to a human language analyzer component 610. For instance, information indicating the hierarchy of clauses 622 is stored at the human language analyzer component 610.

One example of a human language analyzer includes a TKCAT TK extension of the LITI system by SAS Institute, Inc. of Cary, N.C. One example of a clause analyzer is the TKCLAUS by SAS Institute, Inc. of Cary, N.C. One example of a dependency parser is the TKDPRSR by SAS Institute, Inc. of Cary, N.C. One example of a token-level application is TKLING by SAS Institute, Inc. of Cary, N.C. In an application program interface application, TKCAT calls TKCLAUS to analyze a document; TKCLAUS calls TKDPRSR to perform dependency parsing; and TKDPRSR calls TKLING to perform tokenization and part of speech tagging. The tokenized, tagged, parsed, and analyzed document propagates back up the chain as one matrix stored in a single XDBTABLE (a dynamic table data structure).

In this example, clause detection is aided by a set of rules that translate the clause definition into commands to evaluate the dependency parse tree for a sentence, and record the results of an analysis in a matrix for use by the LITI matching algorithm. In this section, the rules used and the resulting matrix is described.

A received document passes through two primary phases:
1. Tagging/dependency parsing, where the document receives token-level morphological and syntactic annotation.
2. Clause identification, where clauses are identified and annotated on the dependency tree using a series of Boolean rules. The output of the clause analyzer is a filled XDBTABLE containing token-level annotations of clause information.

To support one or more operators described herein (e.g., the CLAUS_n operator), the human language analyzer component 610 (e.g., TKCAT TK extension) consumes a table of token-level clause annotations from the Clause Analyzer 620 (e.g., TKCLAUS TK extension), which consumes a table of token-level dependency parse annotations from the Dependency Parser 630 (e.g., TKDPRSR TK extension). FIG. 6A provides an example useful for application programming interface (API) interaction between components of the system 600.

One or more embodiments herein improve information extraction (e.g., from a received document) to a clause level (e.g., using a new operator type like CLAUS_n). For instance, by identifying clause headship and membership among tokens as well as clause type and relationships, one or more embodiments restrict information extraction matches to the context of one or more related main clauses or strong subordinate clauses in a sentence. Additionally or alternatively, where a subordinate clause is embedded within its parent clause, one or more embodiments recombine the pieces of the parent clause into a single clause. All of this information is then leveraged for the purpose of enabling better information extraction.

Figure 6B:
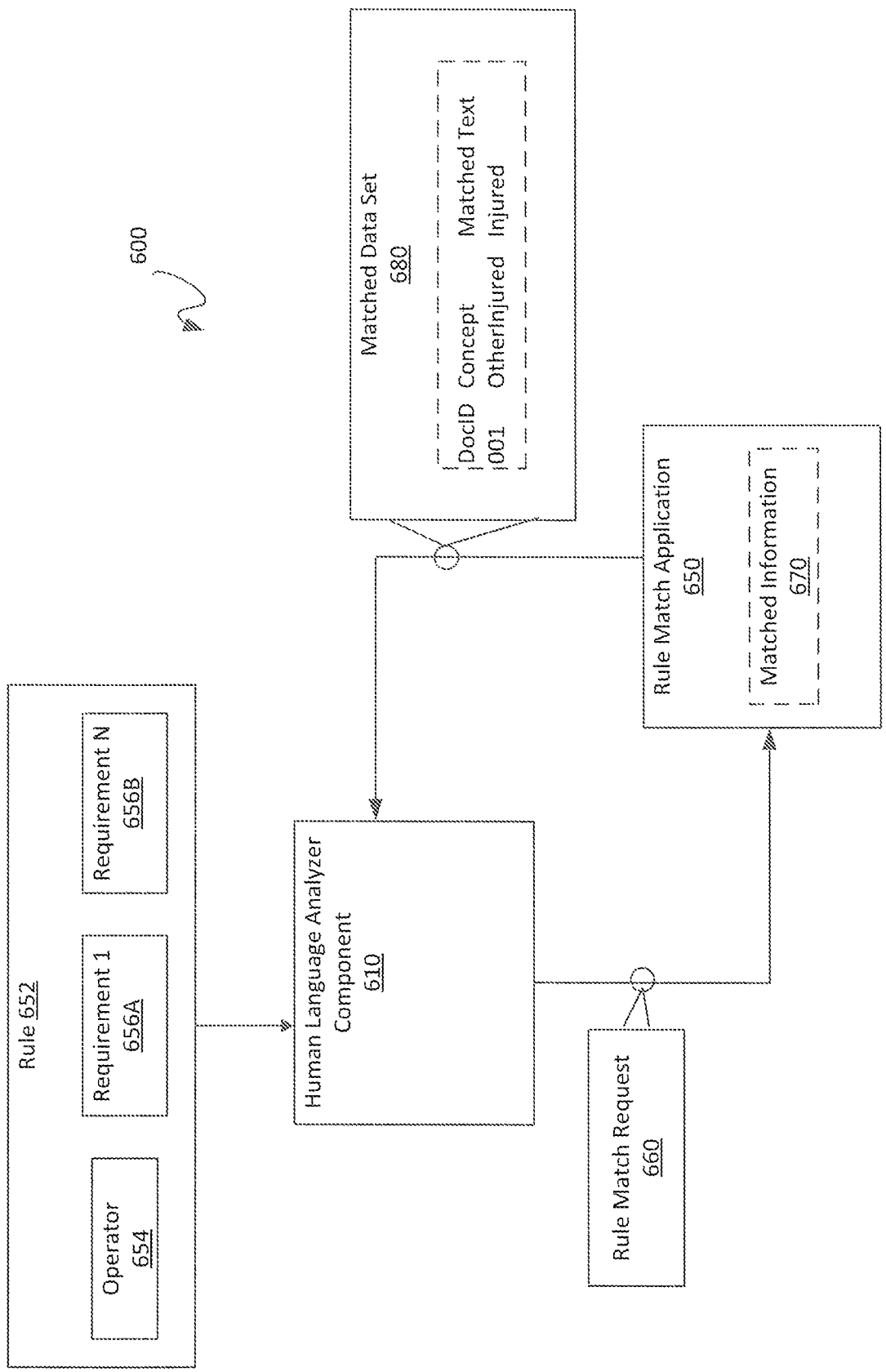
FIG. 6B illustrates an example system comprising a human language analyzer and an information extraction system in at least one embodiment.

FIG. 6B illustrates additional or alternative components of system 600 comprising a human language analyzer component 610 and a rule match application 650 in at least one embodiment. In one or more embodiments, as explained herein, a human language analyzer component 610 (e.g., a component of or a human language analyzer 120) receives a rule 652 comprising an operator 654 (e.g., a CLAUS_n operator) and one or more requirements 656. In this example system 600, the human language analyzer component 610 sends a rule match request 660 to a rule match application 650 (e.g., components and/or applications of human language analyzer 120) to determine whether the text 614 satisfies the rule of the rule match request 660 (e.g., using a hierarchy of clauses 622 information received from one or more components of system 600). In response, the rule match application 650 determines match information 670 indicating whether there was a match on the rule (e.g., there was no match) and/or what the match is. The rule match application 650 then sends, extracts, or otherwise provides to the human language analyzer component 610 matched data set information 680 (e.g., a document identifier, a concept based on the matched text, and/or the matched text). In this example, the rule match request was for a concept rule match. Other concept rules or other types of matches are possible (e.g., predicate rule or fact matches) and would return different matched data set information then shown.

Figure 7:
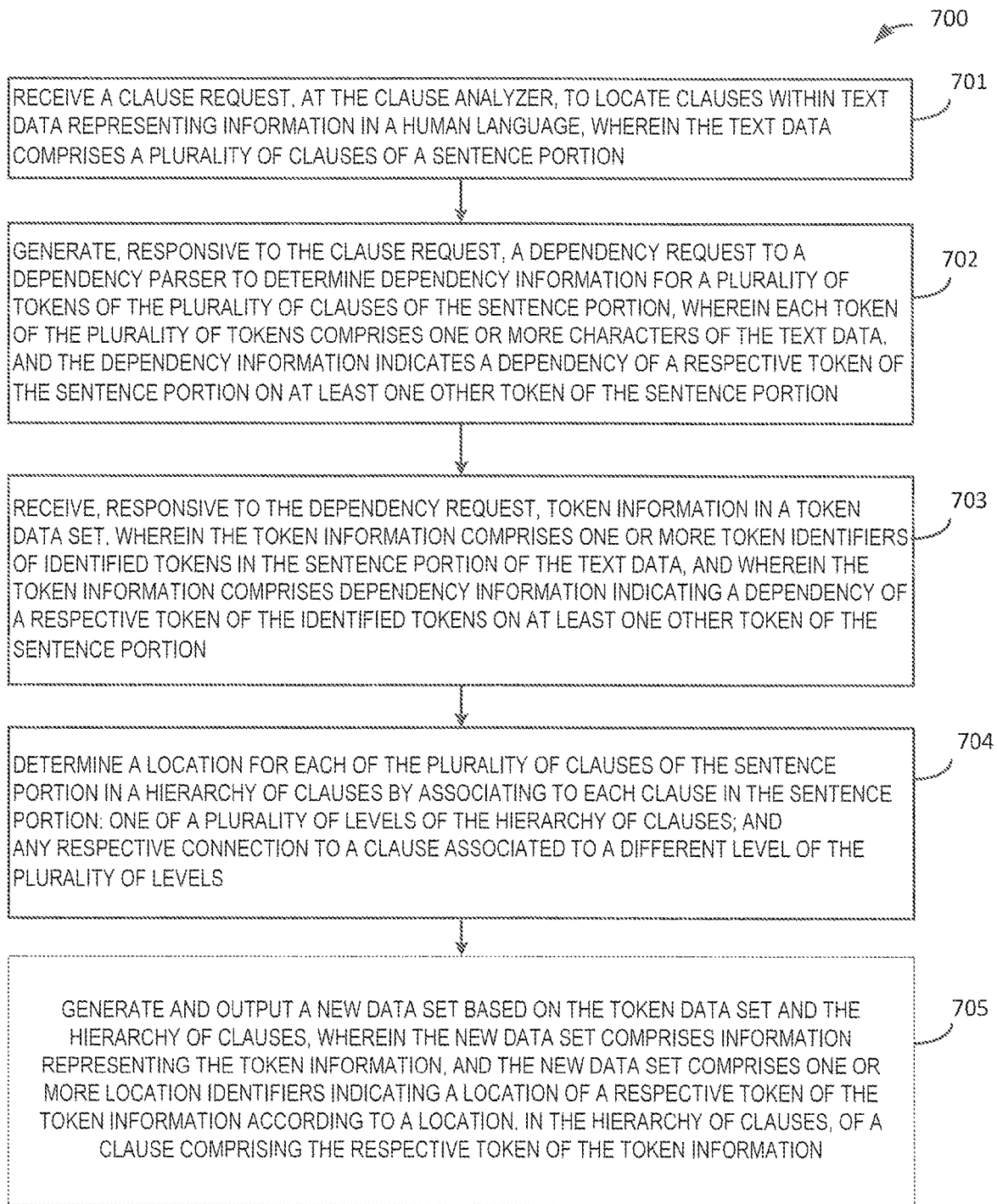
FIG. 7 illustrates an example method for a clause analyzer in at least one embodiment.

FIG. 7 illustrates a method 700 for a clause analyzer in at least one embodiment. For instance, in one or more embodiments, a clause analyzer (e.g. clause analyzer 620) or a clause analyzer as part of a human language analyzer (e.g., human language analyzer 120) implements the method 700.

An operation 701 includes receiving a clause request (e.g., clause request 616) to locate clauses within text data representing information in a human language. The text data comprises a plurality of clauses of a sentence portion.

An operation 702 includes generating, responsive to the clause request, a dependency request (e.g., a dependency request 624) to a dependency parser (e.g., dependency parser 630) to determine dependency information for a plurality of tokens of the plurality of clauses of the sentence portion. Each token of the plurality of tokens comprises one or more characters of the text data. The dependency information indicates a dependency of a respective token of the sentence portion on at least one other token of the sentence portion. One or more tokens of the sentence portion may not be dependent on another token. For instance, a sentence head at a highest level may not be dependent on another token of the sentence portion.

An operation 703 includes receiving, responsive to the dependency request, token information (e.g., token information 636) in a token data set (e.g., token data set 638). In one or more embodiments, the token information includes one or more token identifiers of identified tokens in the sentence portion of the text data. Additionally, or alternatively, the token information includes dependency information indicating a dependency of a respective token of the identified tokens on at least one other token of the sentence portion.

An operation 704 includes determining a location for each of the plurality of clauses of the sentence portion in a hierarchy of clauses (e.g., hierarchy of clauses 124, 324, 524, 622) by associating to each clause in the sentence portion one of a plurality of levels of the hierarchy of clauses and any respective connection to a clause associated to a different level of the plurality of levels.

In one or more embodiments, the operation 704 includes associating a respective connection by identifying a main clause of the hierarchy of clauses, using the dependency tree, and a connection (e.g., a parent-child connection) between the main clause and another clause in the sentence portion at an adjacent level.

An operation 705 includes generating a new data set based on the token data set and the hierarchy of clauses. In one or more embodiments, the new data set includes information representing the token information. Alternatively, or additionally the new data set comprises one or more location identifiers indicating a location of a respective token of the token information according to a location, in the hierarchy of clauses, of a clause comprising the respective token of the token information. For instance, in one or more embodiments, the operation 705 includes generating the new data set by appending the one or more location identifiers as will be described in more detail herein to the token data set received from a dependency parser.

Additionally, or alternatively, the clause analyzer generates a new data set by generating, for respective tokens of the first clause, a clause hierarchy identifier indicating the path from determined clause locations (e.g., via identified clause connections or clause locations). A clause hierarchy identifier for a multi-level path may indicate one or more clauses with locations intermediate to clauses of the hierarchy of clauses.

An operation 708 includes outputting the new data set (e.g., for use by a human language analyzer component 610 and/or a rule match application 650).

Figure 8:
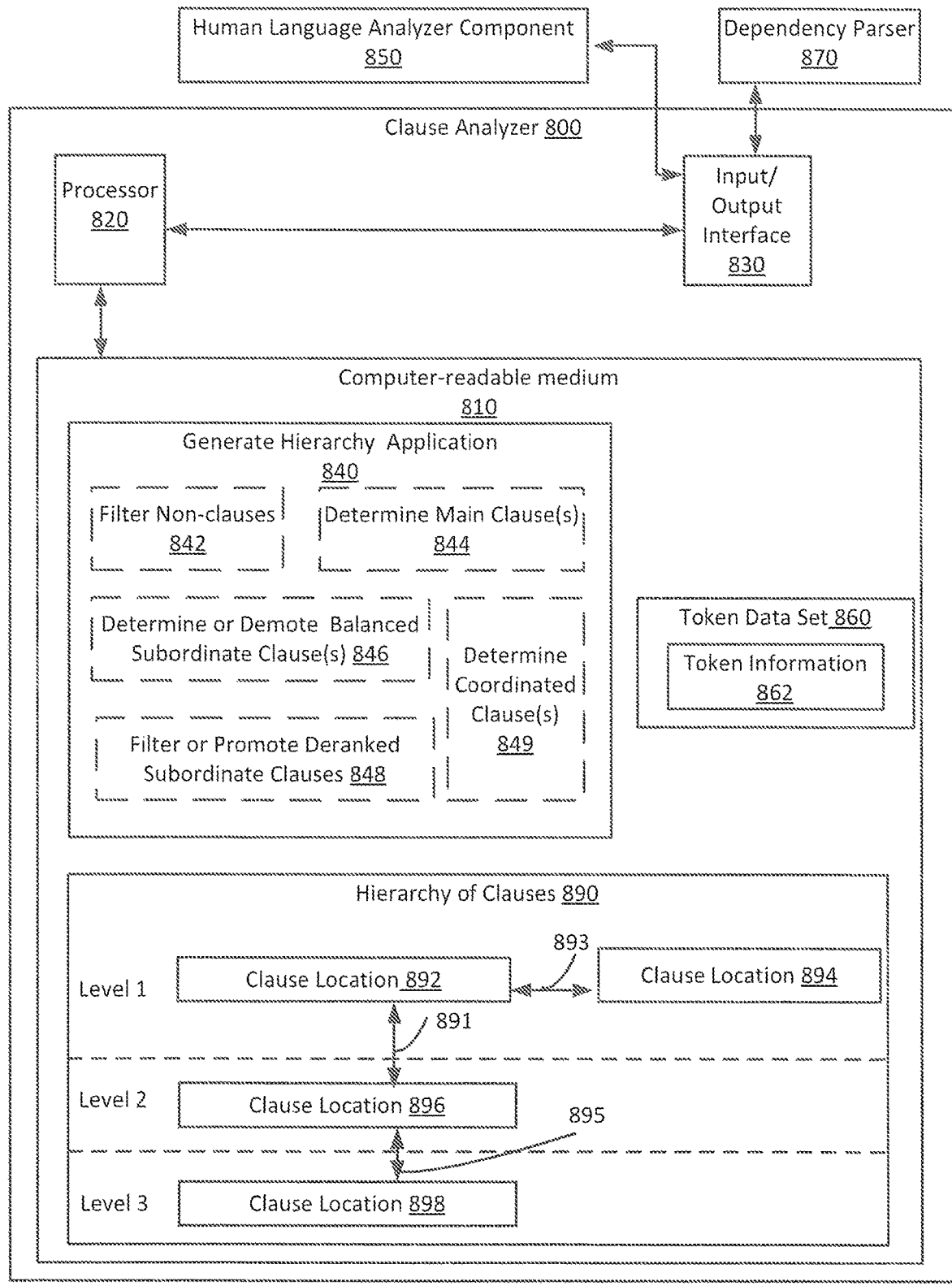
FIG. 8 illustrates an example block diagram of a clause analyzer in at least one embodiment.

FIG. 8 illustrates a block diagram of a clause analyzer 800 in at least one embodiment. In one or more embodiments a clause analyzer 800 has one or more input and/or output interfaces 830 (e.g., to communicate with a human language analyzer component 850). A clause analyzer 800 has a computer-readable medium 810 and a processor 820. In one or more embodiments, computer-readable medium 810 comprises one or more features of computer-readable medium 122 or is computer-readable medium 122. Additionally, or alternatively, in one or more embodiments processor 820 comprises one or more features of processor 123 or is processor 123. For instance, in one or more embodiments, computer-readable medium 810 stores instructions for execution by processor 820. For example, computer-readable medium 810 comprises instructions for a generate hierarchy application 840.

Additionally or alternatively, the computer-readable medium stores data for use by one or more applications of the clause analyzer 800. For example, computer-readable medium 810 stores one or more token data sets 860 (e.g., token data set 638) with token information 862 (e.g. token information 636). Additionally or alternatively, the computer-readable medium stores output from one or more applications of the clause analyzer 800. For example, computer-readable medium 810 stores data representing one or more aspects of a hierarchy of clauses 890. Hierarchy of clauses 890 shows a simple representation of a hierarchy of clauses with three levels formed from one parent-child connection 891 between clause locations 892 and 896 and one parent-child connection 895 between clause locations 896 and 898. Hierarchy of clauses 890 also has a coordinating connection 893 between clause locations 892 and 894. Hierarchy of clauses 890 could alternatively have more or fewer clause locations with more or less levels as described herein.

In one or more embodiments, the generate hierarchy application 840 stores instructions for performing one or more functions and/or applications to determine clauses in text data (e.g., filter non-clauses function 842, determine main clauses function 844, determine or demote balanced subordinate clauses function 846, filter or promoted de-ranked subordinate clauses function 848 and/or determine coordinated clauses function 849).

For instance, the generate hierarchy application 840 causes the clause analyzer 800 to identify whether a clause of a sentence portion is a main clause (e.g., via function 844), balanced subordinate clause (e.g., via function 846), de-ranked subordinate clause (e.g., via function 848) and/or coordinated clause (e.g., via function 849). In one or more embodiments, every token is assigned to a clause and tokens which cannot head clauses are identified and skipped in determining a clause type (e.g. tokens for unrelated punctuation, or related tokens that do not fit prescribed requirements for a clause head).

Additionally or alternatively, the generate hierarchy application 840 causes the clause analyzer 800 to determine a hierarchy of clauses 890 (e.g., connections or paths between identified clauses or clause types). For instance, in one or more embodiments, the clause analyzer 800 determines a first location (e.g., clause location 892) of a first clause of the clauses of a sentence portion by associating a first level of the hierarchy of clauses to the first clause and determine a second location (e.g., clause location 896) of a second clause of the plurality of clauses of the sentence portion by associating a second level of the hierarchy of clauses to the second clause. The second level is different than the first level. The clause analyzer determines a path from the determined first location of the first clause in the hierarchy of clauses to the determined second location of the second clause in the hierarchy of clauses (e.g., via connection 891).

In one or more embodiments, the clause analyzer 800 determines respective locations for one or more clauses at locations with levels intermediate to different of the hierarchy of clauses (e.g., clause location 896 is at a level intermediate between clause location 892 and clause location 898). The clause analyzer 800 determines a path from two locations (e.g., clause location 892 and clause location 898) with the determined respective locations for one or more clauses with levels intermediate to the first level and the second level.

In one or more embodiments, the clause analyzer (e.g., via functions 846 or 848) augments the location of a given clause in the hierarchy of clauses by associating with the given clause a new level in the plurality of levels that is different than a previous level associated to a given clause in the hierarchy of clauses. For instance, if there was a balanced subordinate clause at the clause location 898, it could be demoted to a same level as its parent clause at a clause location 896. Alternatively, if there was a de-ranked subordinate clause sharing a level with its parent clause (e.g., at clause location 892), the de-ranked subordinate clause could be promoted to its own level (e.g., at clause location 896).

Figure 9:
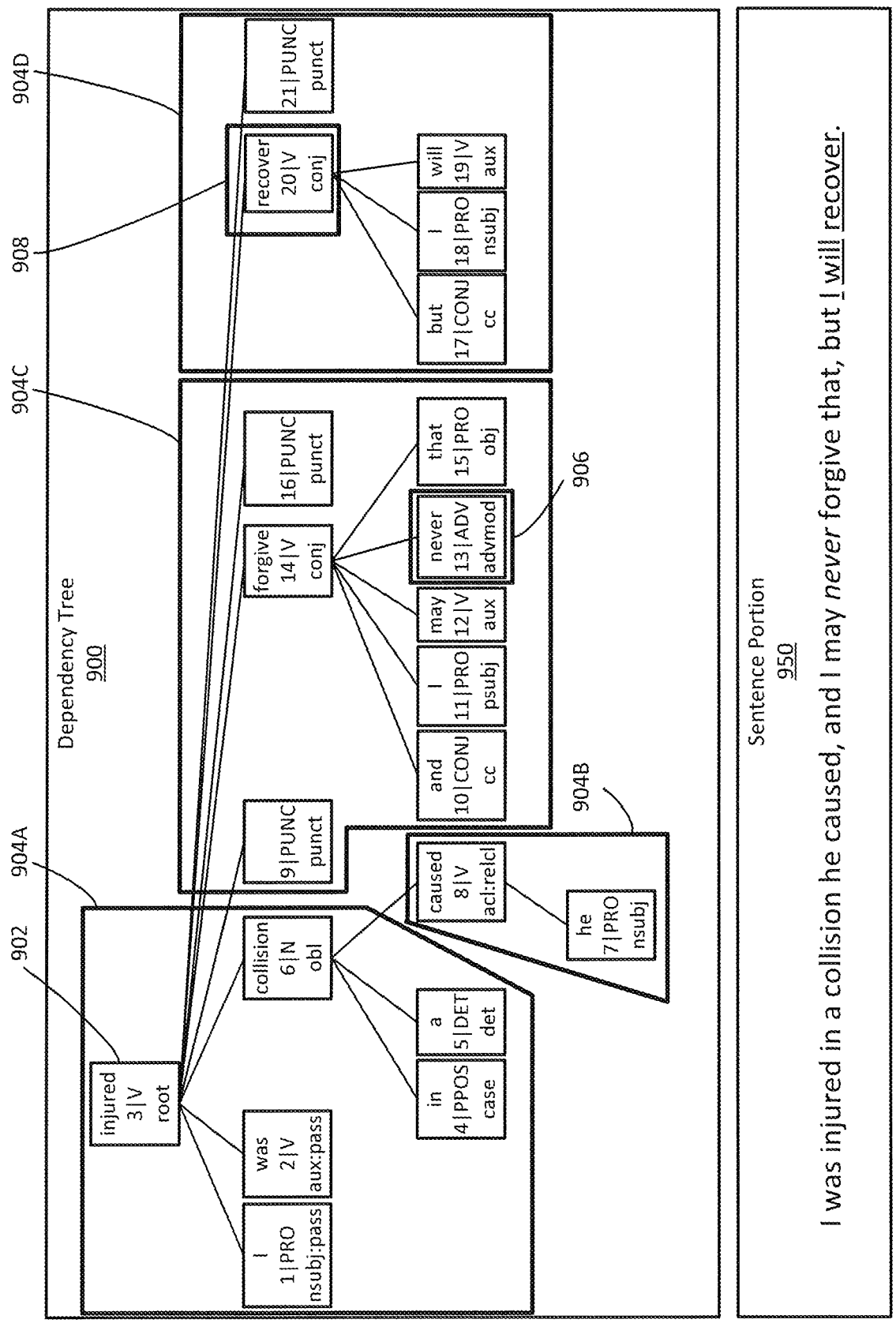
FIG. 9 illustrates an example of a dependency tree representation in at least one embodiment.

In one or more embodiments, a clause analyzer obtains a dependency tree of the sentence portion based on received dependency information (e.g., in response to a dependency request described herein). A dependency tree indicates a syntactic relationship of each token in the sentence portion from a root. FIG. 9 illustrates an example dependency tree 900 representation in at least one embodiment. The dependency tree 900 has a size of 21 tokens. The dependency tree 900 comprises a sentence head 902 that is a token that is the main predicate in the sentence portion. Each token beyond the sentence head forms subtrees. For instance, token "1" for word "I" has a subtree of size 1 because it is the only token in its subtrees (no tokens depend from this token). Alternatively, token "6" for work "collision" has a subtree of size 5 because there are 5 tokens in its subtree inclusive of token "6".

FIG. 9 indicates the syntactic relationship graphically for explanation. However, it should be appreciated that obtaining a dependency tree as described herein could comprise obtaining identifiers or other markers of the relationship without, for instance, a graphical representation. For instance, this dependency tree 900 comprises identifiers of a token's part of speech (e.g., "V" for verb in sentence head 902), a token identifier (e.g., "3" for the sentence head 902 based on token processing order), and/or a token's function in a sentence (e.g., "root" for sentence head 902). A clause analyzer (e.g., clause analyzer 800 or 620) leverages this dependency information to determine or otherwise identify clauses 904 in a sentence portion 950. A clause analyzer or in connection with other components and devices (e.g., human language analyzer or information extraction system) can then extract information based on clause relationships. For instance, based on identifying tokens 906 and 908 and their respective clauses 904C and 904D, information can be extracted from sentence portion 950 (e.g., a token, concept, or sentiment).

In one or more embodiments, a clause analyzer as described herein outputs and/or stores data to indicate a determined hierarchy of clauses based on dependency tree information. For instance, in dependency trees, main clauses attach to the root arc of the sentence or are coordinated clauses with such a clause.

FIG. 10 illustrates a data structure 1000 in at least one embodiment. In one or more embodiments, a clause analyzer receives from a dependency parser token level information (e.g., in a data structure 1000) related to a text (e.g., text 614). In one or more embodiments, the data structure 1000 comprises token identifying information 1002. For instance, token identifying information 1002 includes id 1002A, which is a token identifier unique in a sentence portion, and a word identifier 1002B, which is a token form of a word in the sentence portion. It can also include a start identifier 1002C, which is a token start position by character (e.g., based on a character number in a document, text data/string, etc.). It can also include an end identifier 1002D, which is a token end position by character (e.g., based on a character number in a document, text data, etc.). Additionally or alternatively, the data structure 1000 includes lemma identifier 1004 which is the root form of a token. Additionally or alternatively, the data structure 1000 includes part-of-speech information 1006. Part-of-speech information may include a word class or more specific grammatical information, such as case and person. For instance, part-of-speech (POS) information 1006 includes a tag identifier 1006A, which is a simple POS tag for providing a word class, and xtag identifier 1006B which is a standard POS tag for providing more specific grammatical information. Additionally or alternatively, the data structure 1000 includes dependency information 1008. For instance, dependency information (e.g., derived from a dependency tree) includes a head identifier 1008A, which is a token identifier of a parent token, deprel identifier 1008B, which is a dependency relation to a parent token. Additionally or alternatively, the data structure 1000 includes sentence portion information (e.g., sid identifier 1010, which is a sentence identifier unique in a document, text data/string, etc.)

In one or more embodiments, a data structure output from a dependency parser which is consumed by the clause analyzer is a matrix with one row and one or more columns for each token of the input document. More or fewer data identifying tokens could be passed. This data can then be passed through to the output of the clause analyzer, but with additional columns added to form a new data structure 1000 shown in FIG. 10. Alternatively, a new data structure with more or less information than data structure 1000 can be output from a clause analyzer.

For instance, data structure 1000 comprises additional data representing or indicating a hierarchy of clauses (e.g., hierarchy of clauses 324, 890) (e.g., using one or more location identifiers). For instance, the data structure 1000 comprises a cpath identifier 1012A that indicates a hierarchy pathway between clauses. For instance, tokens 1-6, 9, and 16 based on id 1002A have a cpath identifier 1012A of "0" indicating they are part of a main clause "0" at a main clause location in a clause hierarchy. Tokens 10-15 of clause 1030 are marked with a "3" indicating they are a main clause "3" different from main clause "0" and tokens 17-20 of clause 1040 are marked with a "2" indicating they are a main clause "2" different from main clause "0" and "3". Tokens 7-8 are marked with a "1, 0" representing tokens 7-8 are another clause 1020 different from the main clause "0" but connected to main clause 0 (e.g., in a parent-child relationship). This cpath identifier distinguishes clause 1020's connection from other main clauses of the sentence (i.e. main clauses 1030 and 1040). The path identified or represented by cpath identifier 1012A could alternatively be in a different order, e.g., having the parent clause occur first in the ordering. Alternatively, the cpath identifier 1012A could simply be a parent clause identifier (e.g., indicating an identifier of a parent clause). As another alternative the cpath identifier 1012A could comprise all or a certain number of levels of a hierarchy pathway to show intermediate levels (e.g., cpath "3, 2, 0").

Note that tokens 9 and 16 are punctuation. Depending on implementation choices for clause identification, punctuation could be associated with the main clause as shown here or with other clauses.

In one or more embodiments, the clause analyzer generates a data set (e.g., a new data set) by generating, for each token represented in the token information, a main clause identifier indicating whether a clause is a main clause or a subordinate clause. For instance, the data structure 1000 includes a mcid identifier 1012B, to identify whether a clause is a main clause. In this example, each clause is given a "0" to denote the clause is not a main clause (i.e. it is a subordinate clause) and a numeral n for the nth main clause (e.g., in a data processing or detection order). In one or more embodiments, a clause analyzer identifies a detection ordering of main clauses of the plurality of clauses of the sentence portion; and generates a numeral for a given main clause identifier uniquely representing an identified position in the detection ordering.

In one or more embodiments, the clause analyzer generates a data set with both a cpath identifier 1012A and a mcid identifier 1012B. The identifiers can be combined by a receiver of the data structure 1000 (e.g., a human language analyzer) to gain information about a hierarchy of clauses.

As an optional variation, tokens 10-15 of a clause 1030 could have a cpath identifier or other type of identifier of "3,0" to indicate that there is a connection between clause 1030 or clause "3" and clause "0". However, the mcid identifier for tokens 10-15 indicates that it is a main clause "3", which indicates the connection identified by the cpath identifier is one of a coordinating connection as described herein. Alternatively, tokens 7-8 each have a mcid identifier 1012B of "0" indicating that tokens 7-8 are part of a clause 1020 that is dependent on another clause and thus, the cpath represents a parent-child connection.

More or fewer identifiers are possible in other implementations to represent clause hierarchy.

FIGS. 11A and 11B illustrate example alternative data structures (e.g., generated by a clause analyzer 620 or 800) in at least one embodiment for an alternative sentence: "I searched all over the internet, but I could not find one place in Tampa Bay that sells morcillas, also known as blood pudding, and blood sausages."

FIG. 11A shows an example representation of token data received by a clause analyzer from a dependency parser (e.g., dependency parser 630) in a data structure 1100. For instance, data structure 1100 comprises id identifier 1002A, word identifier 1002B, lemma identifier 1004, tag identifier 1006A, xtag identifier 1006B, head identifier 1008A, deprel identifier 1008B, start identifier 1002C, end identifier 1002D, and sid identifier 1010 described with respect to data structure 1000 for the alternative sentence. Additionally, data structure 1100 comprises additional token identifying information: literal identifier 1002E. This can be useful for implementations that correct text data to account for impreciseness of human communication. For instance, in this example, token with id identifier 1002A of "11" in clause 1155 was corrected from the literal text data "n't" to "not".

FIG. 11B shows a representation of a data structure 1150 that is generated by a clause analyzer (e.g., in response to token data from of clause analyzer). Data structure 1100 comprises token id identifier 1002A, word identifier 1002B, and tag identifier 1006A as an example of token-level information (e.g., from a dependency parser). Other or different token-level information from data structure 1100 could be generated, stored and/or transmitted by a clause analyzer in data structure 1150 (e.g., identifiers of data structure 1100).

In one or more embodiments, the clause analyzer provides one or more of other identifiers in data structure 1100 to provide information on clause relationships, clause types, and/or clause connections for indicating a clause hierarchy.

Data structure 1150 has a mcid identifier 1012B and a cpath identifier 1012A described with respect to data structure 1000. This example indicates a clause hierarchy of depth 3. For instance, as shown for clause 1165 with cid identifier 1105 of "2", there are three clauses 1155, 1160, and 1165 identified by the cpath identifier 1012A ("2,1,3") indicating clause 1165 is dependent on clause 1160, which is dependent on clause 1155.

Data structure 1150 also has a cid identifier 1105 which provides each clause with a number unique in the sentence portion. For instance, the number can be assigned based on a clause detection or data processing ordering. In the example of FIG. 11B, there are 4 clauses identified numbered with a number 0-3 for their cid identifier 1105.

In one or more embodiments, a clause analyzer classifies each token in each respective clause of the plurality of clauses as a head of the respective clause (e.g., a predicate or verb of the clause) or a member of the respective clause. The clause analyzer then generates the new data set by generating, for each token represented in the token information, a clause head indicator indicating whether a respective token is classified by the clause analyzer as a head of the respective clause or as a non-head member of the respective clause. As an example, data structure 1150 has a clauseHeadID identifier 1110 that identifies a token in the clause that serves as the head of that clause with a "1" and a member with a "0". For instance, clause 1170 with cid identifier 0 has a clauseHeadID of "2" representing that the token with id 1002A of "2" and word identifier 1002B of "searched" is the head member of clause 1170. Different indicators could be used (e.g., "H" and "M").

Data structure 1150 has a clauseType identifier 1120 explicitly indicating a clause type. For instance, a given clause could be marked as a type: main clause, balanced subordinate clause, and/or de-ranked subordinate clause. In this example there are only main clauses (marked with an "M") and balanced subordinate clauses (marked with a "B").

Figure 11C:
FIG. 11C illustrates an example of a data structure in at least one embodiment.

In other examples, the clause analyzer classifies a token represented in the token information as a token that heads a de-ranked subordinate clause. FIG. 11C shows a data structure 1180 with a de-ranked subordinate clause (marked with a "D"). As shown, this example sentence has one main clause, two balanced subordinate clauses, and one de-ranked subordinate clause. The clause analyzer determines the location of the de-ranked subordinate clause in the hierarchy of clauses based on the classified token that heads the de-ranked subordinate clause. Other indicators than shown in FIGS. 11B and C could be used to classify clause type (e.g., different numerals associated with a main, balanced, or de-ranked clauses).

Data structure 1150 has a subtreeSize identifier 1125 indicating the size of a subtree from a dependency tree. For instance, token "2" has the largest subtreeSize of "30" because it is the head of its clause (e.g., as indicated by the clauseHeadID identifier 1110), and also there are related or subordinate clauses dependent on this clause. As expected then "30" is also the total number of tokens in the sentence. Other tokens that have no dependent clauses/tokens have a subtreeSize of "1" indicating they are the only token in their respective subtree and no tokens or clauses depend on the token.

One or more location identifiers described here indicate a balanced subordinate clause or promoted de-ranked subordinate clause is at a child location relative to a respective parent clause in the hierarchy of clauses. For instance, cpath identifier 1012A indicates a dependency of clauses denoted by clauseType 1120 as balanced subordinate clauses. Additionally or alternatively, one or more location identifiers could indicate a de-ranked subordinate clause or demoted subordinate clause is a same level as a respective parent clause in the hierarchy of clauses. For instance, if clause 1160 has a mcid changed from "0" to a number this could indicate that the balanced subordinate clause is demoted to a level of main clause.

In one or more embodiments, token information comprises a same indication of a coordination token for any type of coordinating conjunction word in the sentence portion. For instance, as shown in FIG. 11B, tokens with id 1002A of "8" and "27" both have a word identifier 1002B of "and" and a tag identifier 1006A of "CONJ". However, the clause analyzer can determine that token "8" is the start of a new clause while token "27" does not start a new clause. In particular, in an example implementation each clause will have at most one clause head. A clause analyzer can classify a given token as a head of a first clause in the hierarchy of clauses when a given coordination token indicates a relationship between the first clause and a second clause and the second clause contains a token identified as the head of the second clause. For instance, token "12" can be identified as the head of a first clause 1155 because token "2" is identified as a head of another clause 1170. No head or separate clauses are identified with respect to tokens related by token "27".

Figure 12:
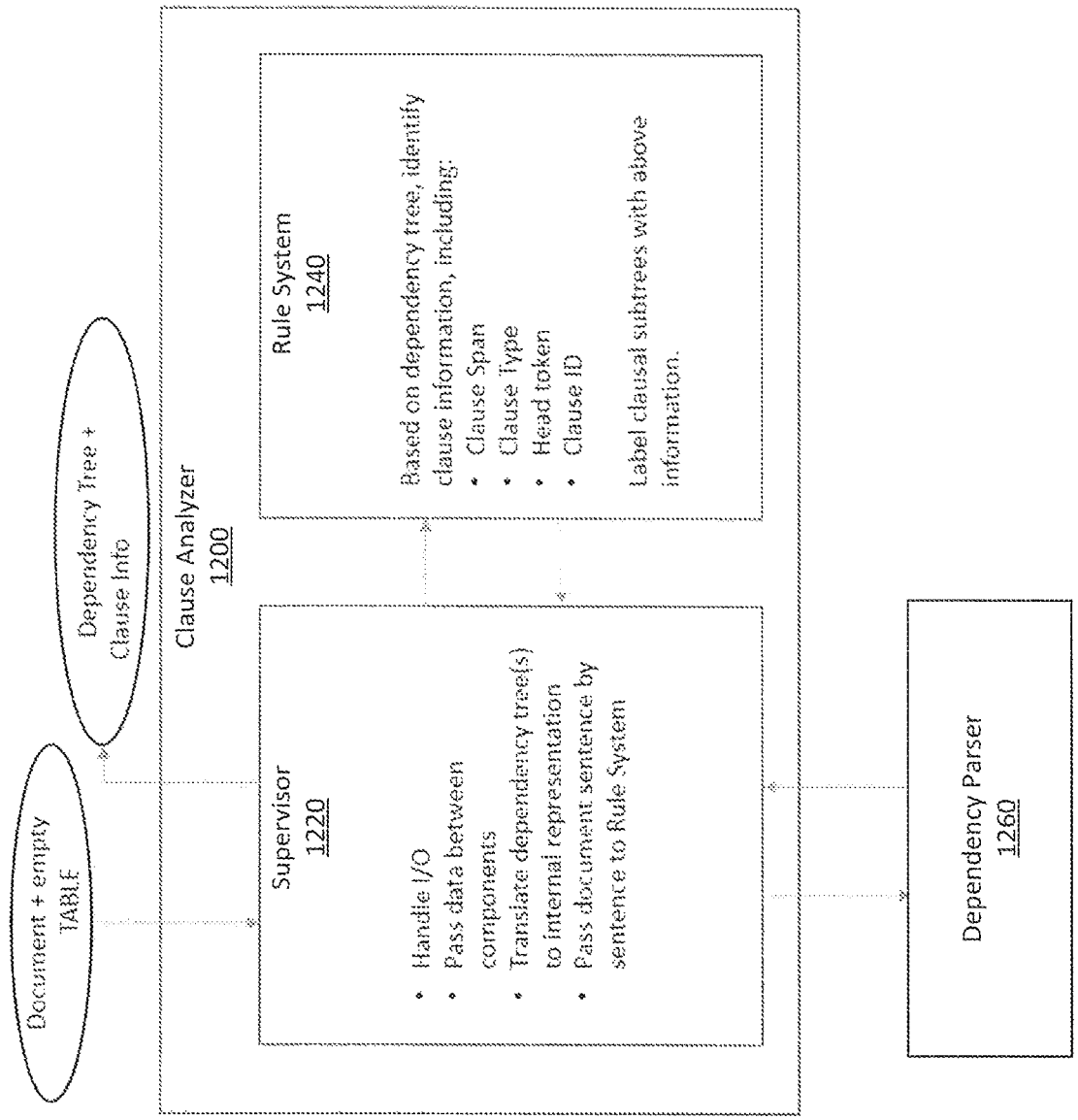
FIG. 12 illustrates an example of a block diagram of a clause analyzer in at least one embodiment.

FIG. 12 illustrates a block diagram of a clause analyzer in at least one embodiment. This is merely an example; other architectures and rules for determining clauses are possible. For instance, a dependency parser could be used to implement one or more rules described herein.

The clause analyzer 1200 (e.g., clause analyzer 620 or 800) is comprised of two primary logical components: the Supervisor 1220 and the Rule System 1240. The Supervisor 1220 handles module input and output, calls the dependency parser, and passes sentence dependency trees to the Rule System. The Rule System 1240 analyzes a sentence's dependency tree and labels the clauses within it. Assuming that the dependency parse is correct, clauses are subtrees in the dependency tree (deptree) which match patterns described by Boolean rules. Below is a description of an example clause detection process within the clause analyzer 1200 extension.

The Supervisor 1220 performs the following operations:
1. Receive document and/or empty XDBTABLE from a dependency parser 1260 (e.g., TKDPRSR).
2. filled XDBTABLE (columns 1-10 of output matrix)<-TKDPRSR
3. (loop) Analyze clauses of each sentence:
   a. Translate sentence from XDBTABLE to internal deptree representation.
   b. Output deptree to Rule System 1240.
   c. Receive deptree with token-level clause information from Rule System 1240.
   d. Output token-level clause information in XDBTABLE.
4. Output XDBTABLE with parse and clause information (e.g., cid and/or
   mcid identifier)

The Rule System 1240 performs the following operations:
1. Identify first main clause.
2. (loop) Traverse the dependency tree, searching for tokens that head clauses. If the head of a main or balanced clause is found, it and each token in its subtree are labeled with a clause identifier (e.g., a cid identifier), main clause identifier (e.g., a mcid identifier), clause type (e.g., a ctype identifier), binary clause head flag, and parent clause identifier:
   a. Identify and skip tokens that cannot head clauses.
   b. Identify heads of de-ranked clauses and skip or leave for promotion.
   c. Identify heads of balanced clauses (and promoted de-ranked clauses).
   d. Identify candidate heads of coordinate clauses.
3. (loop) Identify and label coordinate clauses from list of candidate heads The output of the clause analyzer 1200 provides the caller with token-level clause information (e.g., a clause type and membership of tokens in main and balanced clauses).

In this example, English clauses were defined as follows. This is merely an example of processing rules for analyzing clauses. Other definitions are possible as explained herein. While this example defines requirements in the context of this example, this example should not be considered limiting in other contexts (e.g., of a what a clause must contain in all contexts):
A. All clauses (strong or weak) must contain a predicate:
   a. The verb must be either explicitly stated or an implicit copula combined with an explicit subject. The verb may be finite or nonfinite.
   b. A strong (main or balanced) clause requires the verb either to be finite or the clause to be imperative. Boundaries of a strong clause are recognized for the purposes of information extraction (IE).
   c. Weak clauses (de-ranked) verbal forms include: infinitival verbs, participial verbs, and implicit infinitival copular verbs. The boundaries of weak clauses are not recognized for the purposes of IE.
   d. Examples (all predicates underlined, balanced predicates bolded):
      i. This example has one main clause, two strong subordinate clauses, and five weak subordinate clauses.
         1. Although the announcement was probably made to show progress in identifying and breaking up terror cells, I don't find the news that the Baathists continue to penetrate the Iraqi government [to be] very hopeful.
      ii. This example has one main clause, two strong subordinate clauses, and one weak subordinate clause.
         1. He said that he planned to go after we ate.
B. Strong clauses must contain more than a single word; otherwise, a dangling strong clause will be re-attached to their child clause, if any, or to their parent clause, if they have no children:
   a. They may include only a comma or conjunction plus a verb;
   b. otherwise, there needs to be at least two words, one of which must be a verb (unless the verb is implicit and a subject is explicitly stated).
   c. A conjunction, preposition, or adverb may not stand as the only word in a clause with or without a comma.
C. Main clauses include:
   a. the clause with the main verb of the sentence;
   b. coordinated clauses tied to a main clause; and
   c. bare predicate adjectives or predicate nominatives, without copula (nonfinite form).
   d. Examples with predicates underlined and main clause predicates bolded.
      i. As you know, // on Dec. 15, 2013, I was seriously injured in an automobile collision // caused by your insured, John Doe.
      ii. We've talked to proponents of index arbitrage // and told them to cool it.
      iii. I am a bear //, and John, a donkey.
D. Subordinate balanced (strong) clauses include (underlined):
   a. Adverbial clause—If they lose weight during an illness // they quickly gain it back again afterwards.
   b. Nominal clause—Balcor //, which has interests in real estate, // said // the position was newly created.
   c. Adjectival (relative) clause—The people // whose names are on the list // will go to camp.
E. Subordinate de-ranked (weak) clauses include (underlined):
   a. Infinitival verb forms introduced by a clause marker or preposition (to +infinitive)—She arrived early in order to get a good seat.
   b. Bare infinitives (without "to")—He let his daughter go to the movies with her friends after meeting them first.
   c. Small clause—It seems (to be) OK.
   d. Participial modifiers and gerunds i. The actor given the prize is not my favorite.

ii. Acting foolish, he danced around // and attracted a lot of attention.

F. Periphrastic auxiliary/modal/passive verb constructions with multiple verb forms working together are considered to be a single predicate; they must all be placed into the same clause.

a. Example (underlined): Wilson was claiming // that he had been working for the CIA // when he sold the C-4 to Quaddaffi.

G. Coordinated clauses with shared information will include the shared information in the first clause when that information appears before the first verb, and in the last clause when the information appears after the last verb. In this example, the subject of the second subordinate clause is also 'my car':

a. Example: I then noticed // my car was rolling backwards // and passed me.

More complex rules or tagging can additionally be defined. For example:

A. Clause markers like subordinating/coordinating conjunctions or commas/semi-colons will be included within clause as introductory material at the leading edge or trailing edge of the clause depending on which boundary connects to the parent clause. For embedded clauses, commas may appear on both ends of the subordinate clause.

B. Change to tagging. It is useful to have a list of coordinating conjunctions and a separate tag for them to make dependency trees more accurate.

a. For now, leading material that is not a clause, but helps to mark the boundary, that is usually appended to the following subordinate clause, will continue to be appended even if the following clause is a part of a pair/list of coordinated clauses i. Example: . . . that no matter,
1. What the subject of conversation is
2. Or what words are involved b. Append # i to #1 in the example above to form the first clause c. Additionally or alternatively, 'missing' information in a clause will be copied from one clause into another.

C. Punctuation handling a. Commas on a clause boundary i. If the subordinate clause is separated by the comma from its parent, keep the comma with the child, otherwise keep the comma with the second clause (it may be a coordination clause boundary).

ii. In an embedded clause, the comma may appear at the beginning and end of the child clause.

b. Parentheses and quotes i. If stranded, attach to its neighbor token:
1. To the right if closing; index −1
2. To the left if opening; index +1
3. If unknown (open/close), then attach to the token that is not separated from its neighbor by a space.

ii. Otherwise, attach to the highest ranking clause within; in the example below, both parentheses belong to clause1, not clause2:
[(clause1 [clause2])]

c. Sentence-ending punctuation: Attach to the nearest main clause or to the same clause as its neighbor token d. Parentheticals i. If on the boundary of a clause, but contain no predicate, parenthetical material will be included in the clause it is a part of.

ii. If the parenthetical material is a clause (has a predicate), it will be treated as a subordinate clause of its parent, and punctuation markers will be kept with the subordinate clause, including parentheses, square brackets or curly brackets.

e. Colons, semicolons, dashes on a clause boundary: Determine the membership based on dependency parse defaults.

D. Demotion of strong clauses a. Quotes and indirect quotes will be recognized based upon their main verb.

i. These clauses will be treated as part of their parent clause. In other words the boundary between clauses will be ignored (similar to de-ranked clauses).

ii. A predefined listing of verbs can be used to identify such verbs.

b. Example: the subordinate clause is now a part of the main clause; it can no longer carry information independently:

i. Furukawa Electric Co. said it plans to increase production of computer memory devices on a large scale in the U.S. and Japan.

ii. "The market was pretty dull for most of the day", said Robert H. Chandross, vice president at Lloyds Bank PLC.

E. Promotion of weak clauses a. A participial clause may be promoted under the following conditions:

i. if the clause is separated from its parent clause by a comma, or ii. if the clause has at least 8 tokens, iii. but do not promote, if the word before the participial clause is 'of' or 'at'.

b. Other characteristics that may have specialized rules:

i. Introduction by an unambiguous (or confirmed) conjunction ii. Presence of a subject in the participial clause.

iii. As an example, the italicized clause is promoted to stand as a subordinate clause despite participial verb form: Since purchasing the vehicle, // I've consistently gotten 45-54 mpg Other alternative embodiments may define clauses differently. For instance, other implementations may recognize a clause boundary of a de-ranked clause as prominent enough to consider the de-ranked clause as separate for information matching purposes. Alternatively, a de-ranked clause could be treated as a strong clause when certain criteria for strength are met; such as explicit separation from the parent clause by punctuation, use of a subject, or length of the clause (by word count or in relationship to the average length of clause for the document or corpus). Alternatively or additionally, an implementation may combine a balanced clause with its parent for matching purposes. For example, direct and indirect quotes and statements of belief can be treated as part of their parent clause, ignoring that clause boundary. Alternatively, the right distinction may instead be to treat all stative verbs as weak, and not able to govern a balanced clause effectively. Promotion of weak clauses and demotion of strong clauses may be a tool to provide flexibility to rules defining clauses in certain cases.

In one or more embodiments, clause detection can include different phases of analysis with one or more operations. For instance, main phases of an analysis could include a first, second and third operation.

In a first operation, the first main clause is identified as the child of the invisible "root" node, i.e. the head of the entire tree. During phase 1, the first main clause is detected by identifying the head of the first main clause (the entire tree). This starts with identification of the child of the invisible root node. If it matches the "main clause rule", mark its subtree (i.e. the sentence's entire tree) as the first main clause (clause ID 0, main clause ID 1).

In a second operation, balanced subordinate clauses are identified and their subtrees marked, and de-ranked subordinate clauses identified and mostly ignored (they remain in their parent clause unless promoted). Candidates for coordinate clauses are identified. A depth-first search of the tree is conducted, and each node is tested in order to: (1) ignore tokens that cannot head clauses using the "never clause rule"; (2) identify heads of de-ranked clauses using the "de-ranked clause rule"; (3) identify heads of balanced clauses using the "balanced clause rule"; (4) and identify candidates as nodes with "conj" dependency relation (tested later).

In a third operation, coordinate clauses are identified from the candidate list. Coordinate clauses can be main or balanced. If the conjunct candidate matches the "conj rule", mark its limited subtree (all descendants which currently belong to the same clause) as a coordinate clause.

One or more embodiments provide a rule-based system that takes as input token-level dependency relations, part of speech tags, and stemming information. The system identifies clauses in a sentence by first identifying dependency tree nodes that govern clauses (clause heads) and assigning them a clause type (main, balanced, or de-ranked), then identifying nodes which are coordinated with those clause heads. The subtrees governed by each of these heads and coordinated nodes are clauses. Main and balanced clauses (including promoted de-ranked clauses) are given unique clause identifiers with which the tokens belonging to them are labelled. The rules that identify clause heads are Boolean functions which analyze dependency tree structure and token-level data. Compared to other rule-based systems, using information from the dependency tree, like the size of the subtree a node commands, one or more embodiments provide a unique method to detect clause coordination. For instance, a dependency parser in one or more systems described herein uses the same dependency label (conj) for any type of coordination. Under this system, clause heads that have this dependency label are treated as clause heads if their parents are also heads of clauses.

As an example of a rule-based system, rules for detecting clauses can be realized as Boolean functions in C code which exist in roughly three layers. This abstraction may make it easier to write and maintain more complex rules by reusing code. Ultimately, the rules match based on patterns in and between nodes of the dependency tree. Other coding implementations are also possible and this is given merely as an example.

Layer 1 (or top-level) rules match heads of main, balanced, coordinate, and de-ranked clauses, as well as nodes which cannot head clauses. They are the functions matchesMainClauseRule, matchesBalancedClauseRule, matchesConjRule, matchesDerankedClauseRule, and matchesNeverClauseRule.

Layer 2 rules are called by layer 1 rules and call layer 3 rules. Layer 3 rules are called by layer 2 rules and directly access data structures and/or call other layer 3 rules. Layer 2 rules and Layer 3 rules are the functions matchesRootRule, matchesGeneralSubordinateRule, matchesInfinitiveRule, matchesParticipleRule, and matchesOfAtRule.

Below is a list of the rule definitions. Definitions of and references to layer 1 rules are italicized and bolded, while layer 2 and 3 rules are italicized. References to rule arguments within a rule definition are underlined, while references to dependency tree node data are bolded.

Rules to match main clauses:
*matchesMainClauseRule* (node):
   matchesRootRule(node)
   matchesRootRule(node):
   hasDeprel(node, "root")

Rules to match balanced clauses:
*matchesBalancedClauseRule* (node):
   matchesGeneralSubordinateRule(node)
matchesGeneralSubordinateRule(node):
   hasDeprel(node, "advcl" OR "acl" OR "acl:relcl" OR "ccomp" OR "csubj" OR "csubj:pass")

Rules to match coordinate clauses:
*matchesConjRule* (node)
   node's parent is a clause head
   OR (hasDeprel(node's parent, "conj") AND matchesConjRule(node's parent))

Rules to match de-ranked clauses:
*matchesDerankedClauseRule* (node):
   matchesInfinitiveRule(node)
   OR matchesParticipleRule(node)
matchesInfinitiveRule(node):
   hasChildWithLemmaAndDeprel(node, "to", "mark")
matchesParticipleRule(node):
   hasStdTag(node, "Vpp" OR "Ving")
   AND NOT (hasChildWithDeprel(node, "cop" OR "aux" OR "aux:pass"))
   AND NOT (isCommaBoundSubtree(node) OR node's subtreeSize>=8)

Rules to match filter nodes which cannot head clauses:
*matchesNeverClauseRule* (node):
   hasSimpleTag(node, "PPOS" OR "DET" OR "ADV")
   OR matchesOfAtRule(node)
matchesOfAtRule(node):
   idHasLemma(N, "of" OR "at"), where N is node's leftmost descendant OR the node linearly preceding node's leftmost descendant General helper rules:
hasChildWithLemmaAndDeprel(node, lemma, deprel):
   hasLemma(N, "lemma") AND hasDeprel(N, "deprel"), where N is any immediate child of node
hasChildWithTagAndDeprel(node, tag, deprel):
   hasSimpleTag(N, "tag") AND hasDeprel(N, "deprel"), where N is any immediate child of node
hasChildWithDeprel(node, de:rel):
   hasDeprel(N, "deprel"), where N is any immediate child of node
hasLemma(node, lemma):
   node's lemma=="lemma"
idHasLemma(id, lemma):
   hasLemma(N, "lemma"), where N is the node in the deptree with id "id"
idHasClauseId(id, clauseId):
   hasClauseId(N, "clauseId"), where N is the node in the deptree with id "id"
hasClauseId(node, clauseId):
   node's cid=="clauseId"
hasDeprel(node, de:rel):
   node's deprel=="deprel"

hasSimpleTag(node, tag):
   node's tag=="tag"
hasStdTag(node, tag):
   node's xtag=="tag"
isCommaBoundSubtree(node):
   idHasLemma(D, ",") AND idHasClauseId(D, node's cid),
     where D is the id of:
       node's leftmost or rightmost descendant
       OR node's leftmost descendant's linearly preceding node in the sentence
       OR node's rightmost descendant's linearly subsequent node in the sentence To summarize isCommaBoundSubtree: a node's subtree is "comma bound" if that subtree's first, last, linearly preceding or linearly following node is a comma and if the token beyond that comma is a member of the node's clause. This is true if the potential clause headed by the node (i.e. its subtree) would be separated from its parent clause by a comma.

Figure 13:
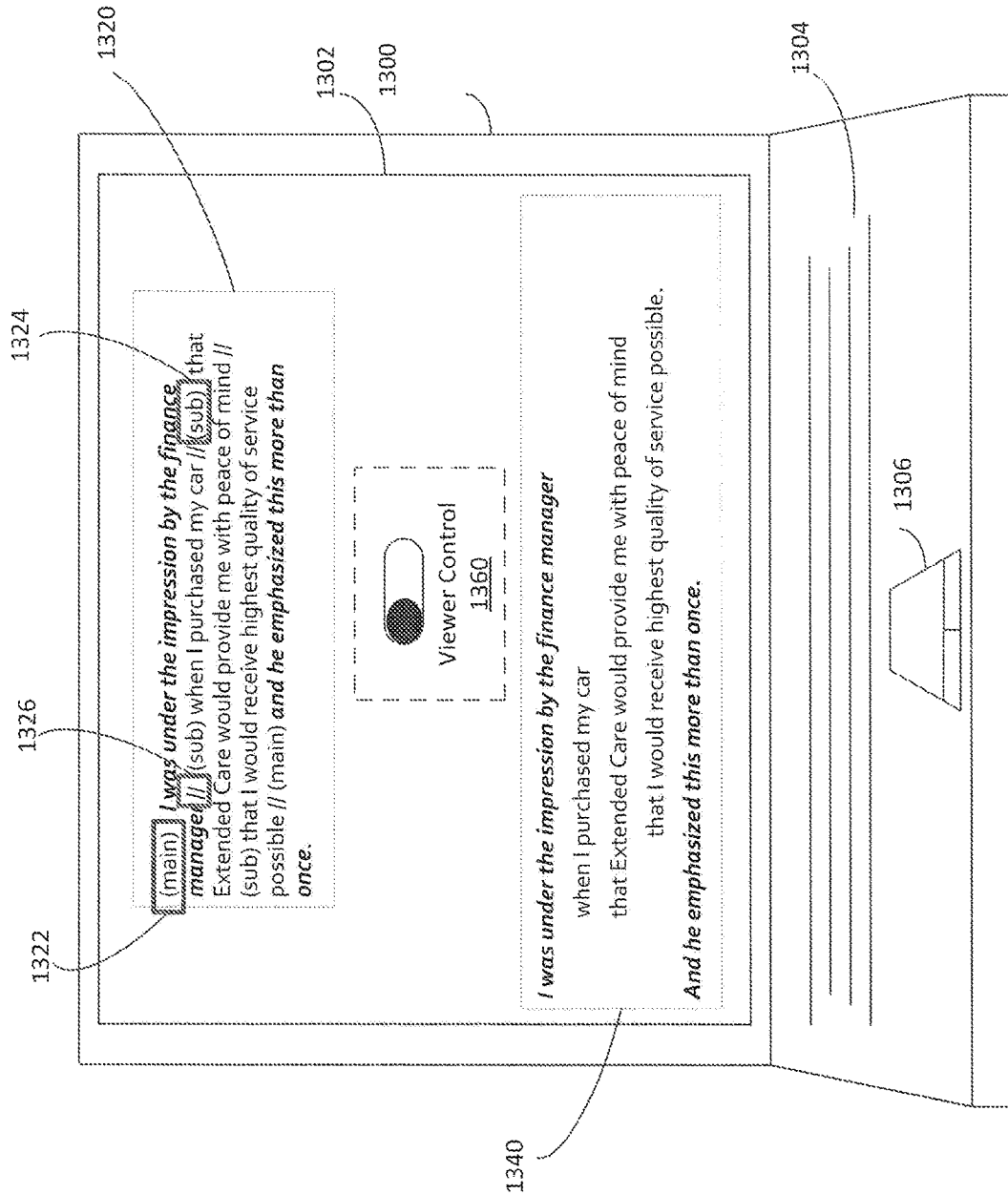
FIG. 13 illustrates an example graphical user interface of a computing device for displaying clause detection in at least one embodiment.

FIG. 13 illustrates a graphical user interface 1302 of a computing device 1300 for displaying clause detection to a user of the graphical user interface. Computing device 1300 can implement one or more aspects of system 100. For instance, computing device 1300 may be an output device (e.g., display 163), and input device (e.g., input device 140) and/or comprise one or more components of a human language analyzer (e.g., human language analyzer 120). For instance, text can be input using keyboard 1304 and track pad 1306.

In one or more embodiments, generating the information indicating a location of indicated text may include graphically showing the location of an identified text component within a sentence portion arranged or otherwise annotated with its hierarchical relationships (e.g., by displaying clause detection in a graphical user interface). This is also useful for applications in which a user may wish to debug or otherwise augment clause identification (e.g. modify clause definitions or apply clause identification to different languages for the user's particular application). Embodiments described herein are applicable to any human language (e.g., English, Russian, Chinese, Czech, etc.) A graphical user interface described herein may also be useful for a user to visualize clause boundaries. A graphical user interface that shows clause boundaries (e.g., as shown in FIG. 13) can also be referred to as a clause boundary display mode.

FIG. 13 shows two ways to depict clause boundaries and/or clause hierarchy information. Viewer 1320 displays a clause boundary mode using a separator 1326 ("//") at boundary points. Some clause coloring or font distinction is helpful but is not required to visually identify main clauses vs. balanced (strong) subordinate clauses. FIG. 13 shows an example with the main clauses in bold and italics. Alternatively or additionally, the main clauses could be a color (e.g., purple) and the subordinate ones could be in a different color (e.g., green). Alternatively or additionally, labels can also be placed within or over each clause that says "main" 1322 or "sub" 1324 (e.g., for visually impaired users). Further, the labels can be numbered to show distance from the main clauses or relationship to a particular clause (e.g., sub1 or sub2).

Viewer 1340 displays a clause boundary mode with indentions to show separation. In this view no labels are needed, but could be used, because the main clauses hug the left side of the viewer 1340. Viewer 1340 also visually shows the hierarchy of the clauses as well as the boundaries using the series of indentions. It can also show any main clauses that are broken by strong subordinate clauses as a single, unbroken clause.

In one or more embodiments, one or both of viewer 1320 and viewer 1340 can be displayed or other ways to graphically represent a clause hierarchy and/or clause boundaries can be presented in the graphical user interface 1302 (e.g., ways shown herein). In any of these modes, a particular generated text component can have a font, color, highlighting or other treatment to distinguish a generated text components placement in a sentence portion. Alternatively, a viewer control 1360 can be used to cycle between different viewers (e.g., using a toggle or setting or right click feature in an interface) and/or to change settings of a viewer (e.g., color or font preferences). One of ordinary skill in the art will appreciate other clause boundary display modes not shown herein.

One or more embodiments herein may provide other possible benefits to a user of the human language analyzer and/or clause analyzer as described herein, including:

(1) Clause coherence: The ability to link multiple parts of the same clause together as a unit, despite any embedded clauses. Each word or token is assigned to the proper clause. This clausal unit can then define the scope of a match for an information extraction rule.

(2) Clause importance: The ability to distinguish between main and subordinate clauses and between strong and weak subordinate clauses. Matching behavior can operate differently across different types of boundaries and can be limited to only main clauses.

(3) Clause hierarchy: Ability to match from parent clause to child clause without matching accidentally across clauses that are less closely related, for example, sister clauses or other clause chains within the same sentence.

(4) Clause distance: Ability to control how many levels of a clause chain to include in a match, therefore, how far to scope the possible boundaries of a match.

(5) Clause connectors: The ability to loan a key connector word from one clause to another, if the word plays a grammatical role in both clauses. This enables matches within a clause that would otherwise require a multi-level match.

These advantages will be described below with non-limiting examples of the application of embodiments described herein.

With regard to clause coherence, because of the dependency tree hierarchy, it is usually possible to recognize when a clause is interrupted by another clause and then continued. In this situation, recombining the parts of the clause together will benefit the user's ability to match within a clause.

EXAMPLE SENTENCE (clause boundaries marked by // and interrupted main clause bolded):
Second the gentleman // who is advising people not to buy // because the battery may run down in two weeks // is doing the car a huge disservice // and is misrepresenting the facts.

MAIN CLAUSE (reconstituted):
Second the gentleman is doing the car a huge disservice In this example, a user may want to examine who is doing the disservice, in which case, having 'the gentleman' as part of the clause is necessary for a good match. This sentence is not specific as to who the gentlemen is, but similar sentences may have for instance a technician, a service team, or a car manufacturer as "the gentlemen" or the role or identity of the gentlemen is determined based on other sentences.

EXAMPLE SENTENCE (clause boundaries marked by // and main clause bolded):
The station owner // despite his technician admitting to topping off the tank // refuses to cover the damages to my car.

The problem here is that the station owner is not covering the damages. It is a complaint that is related to legal claims, and therefore establishes an important relationship of responsibility for damages. Knowing that the two bolded sections above represents one clause and being able to match within that clause without interference from the tokens in other clauses will be beneficial to users.

With regard to clause importance, boundaries between clauses are of different types. There are the boundaries between main clauses, which could stand alone as sentences, and may be tied to other main clauses in coordination relationships. There are also boundaries between main clauses and their dependent subordinating clauses. And finally, there are boundaries between subordinate clauses and their dependent subordinating clauses. Subordinate clauses may also have coordination relationships, sharing the same parent clause and connector word in their parent clause.

Here is how the user can target matches in only main clauses, using the CLAUS_N operator:
CONCEPT_RULE:(CLAUS_0, "FirstPart", "_c{SecondPart}")

The rule will match anything defined in the concept FirstPart, when it occurs in the same main clause as anything matching the concept SecondPart. CLAUS_0 targets matches only in clauses designated as 'main' clauses. These clauses may be designated as a main clause, because: (1) they represent the primary clause of the sentence (and can stand alone grammatically) or (2) they represent a clause that is coordinated with a main clause.

Example sentence where each of the clauses in the sentence are treated as main clauses:
We ordered two filters for $10 plus $8 shipping downloaded installation instructions // and my wife and I installed the filter in about 5 minutes through the glovebox.

A more complex sentence example sentence (main clauses in bold and clause boundaries marked with //):
Because we have had in the past a pretty good relationship with Company C in Nashville // and because we still have a service maintenance agreement with them // we do not want to jeopardize our relationship with them II but this verbal misrepresentation // (if it's common with other users) // and the overcharging ought to be reported.

The purpose of this sentence is to discuss keeping a relationship whole while simultaneously reporting an overcharging problem. The two main clauses contain the pertinent information (the second main clause is split in half by intervening material—and would be reconnected).

Subordinate clauses are usually less important than main clauses generally. In terms of their information load, there are two types of subordinate clauses; the first type, called balanced clauses, tends to hold more information that is independent of the parent clause. As explained herein, balanced clause types can include adverbial clauses, nominal clauses, and adjectival (or relative) clauses.

These clauses are generally introduced by some sort of subordinating conjunction, whether explicitly or implicitly. They also contain a verb that is finite; in other words not a participial or infinitival verb type. Therefore, they have more propositional force. Because these clauses may carry specific information of their own, they can be treated as semi-independent with a connection back to their parent clause; the parent clause may be either a main clause or another subordinate clause.

The second type of subordinate clause is called de-ranked. De-ranked clauses generally have less information when standing alone than do the balanced types, and they do not contain a finite verb (unless acting as an imperative). They may or may not contain the same level of propositional content as a balanced clause, but the tendency is not to be as rich. Therefore, information in such clauses may be missing that is required to make a basic level of sense and the parent clause can also become nonsensical when such clauses are removed. As explained herein de-ranked clause types may include infinitival clauses (to +verb), participial clauses (-ing/-en forms of verb with no auxiliary or modal), and small clauses (implicit copula verb infinitive; to +be).

There are other clauses or phrases that are considered 'de-ranked', but they have no overt predicate. One type is gerundial clauses, which have the same verb-like form as a participial clause, but act as nouns. Because they are difficult to distinguish from participial clauses, de-ranked subordinate clauses with no overt predicate may be treated the same way as participial clauses. The other type of de-ranked clause is a de-verbal adjective or noun (derived adjective or noun from a verbal form). This type will be ignored, since it has neither the form nor the meaning of a predicate.

A user may match information contained within any main or subordinate (and balanced) clause type using the CLAUS_1 operator. Any subordinate, de-ranked clause will be treated as a part of its parent clause with no boundary.

Example sentence (clause boundaries marked with // and de-ranked clause boundaries in italics):
Company A Service was not aware of the problem or of any recall // so they were unwilling to do anything about it In this example sentence, there is a main clause (bolded). The break indicated by // starts a balanced subordinate clause with the conjunction "so". This second clause leads to a de-ranked subordinate clause, which is marked by italics. In the first clause, the user may seek out the relationship of awareness and an issue or recall. The underlined pieces in one or more examples may be possible information extraction targeted text to show this relationship. In the second clause, the italicized part contains interesting information; both that they were 'unwilling' and 'to do anything' are the likely targeted text. Here are two potential rules to target the underlined information above:
CONCEPT_RULE:(CLAUS_1, "AwarenessWord", "IssueWord")
CONCEPT_RULE:(CLAUS_1, "ResponsiveWord", "ActionTaken")

Here is another example to show the difference between balanced and de-ranked subordinate clauses (clause boundaries marked with // and de-ranked clause boundaries by italics):
The station owner // despite his technician admitting to topping off the tank // refuses to cover the damages to my car.

If the division of clauses included de-ranked clauses, important related information like admission and topping off the tank would appear in separate clauses, with the latter clause holding so little contextual information that it would be hard to determine what it means on its own. This rule will match the targeted (underlined) concepts in the sentence above:

CONCEPT_RULE:(CLAUS_1, "AwarenessWord", "IssueWord")

In one or more embodiments, clause boundaries for de-ranked clauses are ignored, so that matches work across the boundary between 'admitting' and 'to', which is exactly what the CLAUS_1 operator is designed to do. Alternatively, this could also be a toggle/property that users could change.

With respect to clause hierarchy, one or more embodiments involves taking advantage of the hierarchical relationships between clauses and matching across clause boundaries (e.g., from parent to child) preventing random matches across clauses that are unrelated in structure as determined by the dependency parsing tree.

A user will be able to leverage the hierarchical relationships between clauses by using a number greater than 1 in their CLAUS_N operator. Use of CLAUS_2 will mean to match across the boundary between parent and child clause; in addition all matches of CLAUS_1 will be included. For example, these rules will match a malfunction and the part of the vehicle that is involved:
PREDICATE_RULE:(part, malf):(CLAUS_1, "_malf{ProblemWord}", "_part{PartName}")
PREDICATE_RULE:(part, malf):(CLAUS_2, "_malf{ProblemWord}", "_part{PartName}")

In an example sentence with main clause bolded and located words underlined:
However it appeared // that the cracking could have started on the driver side of the window // where one of the fuse boxes is located.

This sentence would find the following match with the first rule:
cracking=malf & window=part
It would find these matches with the second rule:
cracking=malf & window=part
cracking=malf & fuse boxes=part Taking this capability a step further, users could use the CLAUS_2 operator to match across only some types of clause boundaries, if they wish. For example, perhaps the user wants to match situations where an event of customer interaction occurs (e.g., a customer getting their luggage back) and what item ended up with what issues. An example rule:
PREDICATE_RULE:(item, issue, eventV, eventO): (CLAUS_3, (CLAUS_1, "_eventV{getWord}", "_eventO{belongingWord}"), (CLAUS_2, "_item{luggageItem}", "_issue{issuePhrase}"))

An example sentence with indents showing levels in a clause hierarchy:
I picked up my luggage only to discover that
a wheel was missing off of my suitcase,
and my garment bag looked like
it had been run over by a truck!
Here are the matches from this sentence:
EventV=picked up
EventO=luggage
Item=garment bag
Issue=run over by a truck Notice that there is not a problem with getting the issue with the wheel and the suitcase mixed up with the issue with the garment bag, because that issue is not on the same clause path.

With respect to clause distance, clause distance takes the clause hierarchy idea of related clauses a step further, providing the user with the ability to specify "how many" successive linked clauses can be matched across. Some languages or text types may tend to put related information relatively close together, while others may separate them with more intervening and clarifying material. In that case, the user can determine which level of relatedness they are seeking in their rule set by increasing the number of related clauses that can match for a given rule. Use of CLAUS_3 will mean that there can be a related chain of up to 3 linked clauses, CLAUS_4 matches across up to 4 linked clauses, etc.

In an example sentence with the main sentence bolded:
This all could have been avoided // if the car had a simple screen over the place // where fresh air is gathered just below the forward windshield inside the plastic cover.

This sentence has the problem statement that something was wrong in the main clause, and the part that is impacted is two subordinate clauses down the hierarchy. So, this rule will match the underlined concepts:
PREDICATE_RULE:(malf,part):(CLAUS_3, "_malf{ProblemWord}", "_part{PartName}")

In fact, the rule will match everything that the CLAUS_3 operator will match and also everything that CLAUS_2 and CLAUS_1 will match, so the matches list would be:
could have been avoided=malf & screen=part
could have been avoided=malf & forward windshield=part
could have been avoided=malf & plastic cover=part In an example sentence, with main clause bolded:
However it appeared // that the cracking could have started on the driver side of the window // where one of the fuse boxes // that controls the rear defrost is located.

The user could apply this rule to find all three parts that may be involved the problem:
PREDICATE_RULE:(malf,part):(CLAUS_3, "_malf{ProblemWord}", "_part{PartName}")

This rule would find the following matches in the extended sentence:
cracking=malf & window=part
cracking=malf & fuse boxes=part
cracking=malf & rear defrost=part The user would not require the CLAUS_4 operator, because there is no useful information in the main clause, but using it would not change the matches in this sentence.

With respect to clause connectors, sometimes a child clause relies on key information in the parent clause to be a full proposition and sometimes a parent clause has a missing object or subject that is filled by a subordinate clause In these cases, information that is in one clause is important to interpretation of a related clause. In clause connectors related to subordinate clauses, it is usually the case that each clause is attached in the dependency tree to a meaningful term in the parent clause. In such a situation, it may be useful to be able to leverage the connector word in a match that is considered to be 'within the clause' by assessing the connector word as the word that overlaps both the parent and child clause. The connector word is the word that the subordinate clause is connected to in the dependency tree; no additional analysis is required.

For example, admission of wrongdoing or fault is an important legal concept. In the sentence below, the subordinate clause is connected by the word 'admit'. Using this word as a connector would mean being able to write the rule below to capture the idea of admission of wrongdoing.

In an example sentence and rule:
They didn't want to admit // they were wrong.
CLAUSE 1: They didn't want to admit
CLAUSE 2: they were wrong→→ADMIT—they were wrong
CONCEPT_RULE:(CLAUS_1, "AdmissionWord", "_c{WrongdoingWord}")

Using the clause 2 after connector enhanced transformation, then the admission word would be satisfied by the connector (in all caps above—ADMIT) and then wrongdoing can also be found in the clause (matching the phrase—they were wrong). To help users understand this option (which may be a toggle for them) a visual cue in the clause boundary display mode could be used, like the all-caps shown in this example.

Alternative or additionally, the connector word could be shown in a graphical user interface as described herein at the beginning of any subordinate clause as illustrated in the below sample sentences in clause boundary display modes described herein with main clause bolded.

In one view with clause boundaries marked with "//":
I was under the impression by the finance manager // IMPRESSION—when I purchased the car with the care plan// PURCHASED—so that Extended Care would provide me with peace of mind // IMPRESSION—that I would receive highest quality of service possible.

In another view with indents used to mark clause hierarchy:
I was under the impression by the finance manager
    IMPRESSION—when I purchased my car with the care plan
        PURCHASED—so that Extended Care would provide me with peace of mind
    IMPRESSION—that I would receive highest quality of service possible.

Note that although there is a hyphen separating the connector from the subordinate clauses, this hyphen is only an example for display purposes.

The rule below would match the clause that explains why the user bought extended care:
CONCEPT_RULE:(CLAUS_1, "BuyWord", "ExtendedCare", "_c{ReasonPhrase}")

The first argument would match the connector "PURCHASED" and the second and third argument would match "Extended Care" and "peace of mind" in the same clause.

As another example related to parent clause connectors, it is common for a nominal subordinate clause to play the role of subject or object in a parent clause. In this case, the parent clause loses potentially useful information and coherence when removing the subordinate clause. In order to offset this gap, there may be the possibility to provide a link or a placeholder marker that indicates this type of relationship.

In the example sentence below the main clause (bolded) lacks an object:
I don't know // what the cost to me will be // until I get a radiator // and start the car up to see // if there is any motor damage.

What is not known? That slot is filled by the second clause; the cost is unknown. Using the connector approach, looking at words in the subordinate clause would find the word 'cost' and link it to the main clause. This may be challenging, because the most useful word is not always the word that connects the two clauses in this downward-looking scenario. The clause could be marked as 'incomplete' on its own like this with the placeholder underlined:
I don't know <<XX>>// what the cost to me will be // until I get a radiator // and start the car up to see // if there is any motor damage.

Alternatively, different placeholders are possible like this:
I don't know <<object>>// what the cost to me will be // until I get a radiator // and start the car up to see // if there is any motor damage.

The benefits to recognizing that there is a missing part in the clause include showing the user that there is a missing information component in clause boundary display mode, which helps in readability of some clauses (see example below; main clause would otherwise be "Basically is"). Additionally or alternatively, benefits include giving the user a toggle or setting that allows them to match across the boundary between such clauses using CLAUS_1. Additional or alternative benefits include inserting content into the missing slot at a later stage, showing propositionally complete clauses from the context. This would be a stage of semantic analysis.

Here is another example sentence, which shows that although main clauses are most likely to have this type of gap, subordinate clauses can have them as well, if they have subordinate clause children. It also shows what a clause without this enhancement can look like, when it has little other information other than that which is missing; the main clause bolded "Basically is", which most users would agree looks odd and incomplete:
Basically // what they told me at the service department // is // that I have to see // what happened before happening again // since there were no injuries.

Placeholders can help improve a visual display of the information and provide links and connectors to user of the graphical interface:
Basically <<subject>> is <<object1>>
    IS—what they told me at the service department
    IS—that I have to see <<object2>> happening again
        SEE—what happened before
        SEE—since there were no injuries If we implement connector matching as described above, it does not help as much in this sentence, because the words "IS" and "SEE" are not rich in information. However, it is also not harmful. The placeholder links in the parent clauses, as shown in double angled brackets, are ready for inserting additional information into the gaps by other analyzers (e.g., doing semantic analysis). For example, analyzers could insert information like this:
    <<Subject>>=they told me
    <<Object>>=I have to see
    <<Object>>=what happened before
Resultant sentence:
Basically <<they told me>> is <<I have to see>>
    IS—what they told me at the service department
    IS—that I have to see <<what happened before>> happening again
        SEE—what happened before
        SEE—since there were no injuries This is only a hypothetical example from taking any subject/verb/object from the subordinate clause and adding some linguistic tweaks. The propositional content at each level is thereby made more complete. Other examples are possible. This proposal of setting up links will create a framework for showing the user the information gap in the clause and for helping to identify and plug such gaps later.

As another example involving coordination, which is a different type of relationship between clauses than the hierarchical one between independent and subordinating clauses, coordinated clauses will share information that is pertinent to both clauses. Allocating the shared information to one clause or the other is the typical way of dealing with this problem. However, in information matching, there may be problems with allocating the information to only one clause and then trying to match propositions within a single clause or clause hierarchy. Therefore, some degree of semantic gap-filling may be useful in order to allocate shared information to both clauses.

What is claimed is:

1. A computer-program product tangibly embodied in a non-transitory machine-readable storage medium, the computer-program product including instructions operable to cause a human language analyzer to:
- receive, at the human language analyzer, text data representing information in a human language, the text data comprising a plurality of clauses of a sentence portion;
- obtain a data structure defining a defined hierarchy of clauses, wherein the defined hierarchy of clauses associates each clause of the plurality of clauses of the sentence portion with one of a plurality of levels, and wherein the defined hierarchy of clauses defines hierarchy connections between clauses associated with different levels of the plurality of levels;
- receive, at the human language analyzer, a computer command for identifying a text data component of the text data, wherein the computer command comprises a first operator and at least two requirements for the text data component, wherein the first operator limits computer identification of the text data component to one or more clauses of the sentence portion that collectively satisfy the at least two requirements and are hierarchically-related according to the hierarchy connections of the defined hierarchy of clauses;
- locate, based on the first operator, two clauses of the sentence portion that are on two different levels of the defined hierarchy of clauses and are hierarchically-related according to the hierarchy connections of the defined hierarchy of clauses;
- identify that a first requirement of the at least two requirements is met in a first clause of the two clauses;
- identify that a second requirement of the at least two requirements is met in the first clause or a second clause of the two clauses;
- responsive to identifying that the first requirement is met and identifying that the second requirement is met, locate the text data component from one of the two clauses;
- generate, responsive to the computer command, generated data representing the located text data component by the human language analyzer according to the computer command; and
- output to an output device the generated data.

2. The computer-program product of claim 1, wherein the first operator has a modifiable string indicating a distance across respective connections of clauses associated with different levels in the defined hierarchy of clauses.

3. The computer-program product of claim 2,
- wherein the modifiable string is a numeral n greater than or equal to two;
- wherein the defined hierarchy of clauses defines one or more continuous levels of clauses based on hierarchy connections of the defined hierarchy of clauses; and
- wherein the modifiable string limits identification of the text data component to clauses that are inclusively within n continuous levels of the one or more continuous levels of clauses.

4. The computer-program product of claim 2, wherein the modifiable string is a numeral that limits identification of the text data component to a clause:
- that is associated with a level of the plurality of levels that indicates a main clause in the defined hierarchy of clauses; and
- that satisfies the at least two requirements.

5. The computer-program product of claim 2, wherein the modifiable string is a numeral that limits the identification of the text data component to a clause that is identified as a balanced subordinate clause or a promoted de-ranked subordinate clause by the human language analyzer and that satisfies the at least two requirements.

6. The computer-program product of claim 1,
- wherein the first operator is one of a plurality of operators that comprise a second operator that limits identification of the text data component to any clauses that are identified by the human language analyzer as a main clause and that individually satisfies the at least two requirements;
- wherein the first clause is identified by the human language analyzer as a main clause; and
- wherein the instructions are operable to cause the human language analyzer to extract the text data component responsive to identifying that the second requirement is met in the first clause of the two clauses.

7. The computer-program product of claim 1, wherein the first operator is one of a plurality of operators that comprise a second operator that limits identification of the text data component to any clauses that:
- are one of clauses identified by the human language analyzer as either a main clause, a balanced subordinate clause, or a promoted de-ranked subordinate clause; and
- individually satisfies the at least two requirements.

8. The computer-program product of claim 1,
- wherein each clause of the plurality of clauses of the sentence portion of the text data comprises one or more tokens;
- wherein each token of the one or more tokens comprises one or more characters of the text data; and
- wherein the defined hierarchy of clauses is defined based on a dependency tree indicating a dependency of a respective token of the sentence portion of the text data on another token of the sentence portion of the text data.

9. The computer-program product of claim 8, wherein the instructions are operable to cause the human language analyzer to identify the text data component based on the computer command, parts of speech of the one or more tokens in the text data and morphological information of the one or more tokens.

10. The computer-program product of claim 1,
- wherein the computer command defines a Boolen relationship between the at least two requirements and the at least two requirements comprise a text string or text concept; and
- wherein the text string defines specific characters in a specific order that must be found in the text data to satisfy a requirement, and the text concept defines a specific concept that a given collection of text data characters must satisfy to satisfy a requirement.

11. The computer-program product of claim 1, wherein each of the plurality of clauses contains a predicate that is an explicit verb, or an implicit copula combined with an explicit subject.

12. The computer-program product of claim 1, wherein the instructions are operable to cause the human language analyzer to:
- identify a de-ranked subordinate clause in the sentence portion of the text data, wherein a meaning communicated by the de-ranked subordinate clause is dependent on a respective parent clause in the text data; and determine that the de-ranked subordinate clause has a same level in the defined hierarchy of clauses as the respective parent clause in the defined hierarchy of clauses.

13. The computer-program product of claim 1, wherein the instructions are operable to cause the human language analyzer to:
identify a balanced subordinate clause in the sentence portion of the text data, wherein a meaning communicated by the balanced subordinate clause is dependent on a respective parent clause in the text data; and
determine that the balanced subordinate clause has a level adjacent a respective parent clause in the defined hierarchy of clauses.

14. The computer-program product of claim 1, wherein the instructions are operable to cause the human language analyzer to:
identify multiple main clauses in a same sentence portion of the text data; and
determine one clause of the multiple clauses is not hierarchically-related to other clauses of the multiple main clauses in the defined hierarchy of clauses.

15. The computer-program product of claim 1, wherein the instructions are operable to cause the human language analyzer to identify an interrupted clause in the plurality of clauses is split by an embedded clause in the plurality of clauses such that all or a portion of words of the embedded clause is between words of the interrupted clause.

16. The computer-program product of claim 1, wherein the text data comprises English language text data.

17. The computer-program product of claim 1,
wherein the instructions are operable to cause the human language analyzer to detect a sentiment for the located text data component indicating an emotion conveyed related to the located text data component; and
wherein the generated data is the sentiment.

18. The computer-program product of claim 1,
wherein the instructions are operable to cause the human language analyzer to classify the text data or the located text data component as a first category of predefined possible categories for extracted text, wherein the predefined possible categories are predefined model outcomes for the computer command; and
wherein the generated data is the first category.

19. The computer-program product of claim 1, wherein the instructions are operable to cause the human language analyzer to receive the text data by:
receiving the text data from user input via a sensor or displayed graphical user interface;
receiving the text data from an electronic document located using a displayed graphical user interface; or
receiving the text data from a computing device via a programming interface.

20. A computer-implemented method comprising:
receiving, at a human language analyzer, text data representing information in a human language, the text data comprising a plurality of clauses of a sentence portion;
obtaining a data structure defining a defined hierarchy of clauses, wherein the defined hierarchy of clauses associates each clause of the plurality of clauses of the sentence portion with one of a plurality of levels, and wherein the defined hierarchy of clauses defines hierarchy connections between clauses associated with different levels of the plurality of levels;
receiving, at the human language analyzer, a computer command for identifying a text data component of the text data, wherein the computer command comprises a first operator and at least two requirements for the text data component, wherein the first operator limits computer identification of the text data component to one or more clauses of the sentence portion that collectively satisfy the at least two requirements and are hierarchically-related according to the hierarchy connections of the defined hierarchy of clauses;
locating, based on the first operator, two clauses of the sentence portion that are on two different levels of the defined hierarchy of clauses and are hierarchically-related according to the hierarchy connections of the defined hierarchy of clauses;
identifying that a first requirement of the at least two requirements is met in a first clause of the two clauses;
identifying that a second requirement of the at least two requirements is met in the first clause or a second clause of the two clauses;
responsive to identifying that the first requirement is met and identifying that the second requirement is met, locating the text data component from one of the two clauses;
generating, responsive to the computer command, generated data representing the located text data component by the human language analyzer according to the computer command; and
outputting to an output device the generated data.

21. The computer-implemented method of claim 20, wherein the first operator has a modifiable string indicating a distance across connections of clauses associated with different levels in the defined hierarchy of clauses.

22. The computer-implemented method of claim 20,
wherein the first operator is one of a plurality of operators that comprise a second operator that limits identification of the text data component to any clauses that are identified by the human language analyzer as a main clause and that individually satisfies the at least two requirements;
wherein the first clause is identified by the human language analyzer as a main clause; and
wherein the computer-implemented method further comprises extracting the text data component responsive to identifying that the second requirement is met in the first clause of the two clauses.

23. The computer-implemented method of claim 20, wherein the first operator is one of a plurality of operators that comprise a second operator that limits identification of the text data component to any clauses that:
are one of clauses identified by the human language analyzer as either a main clause, a balanced subordinate clause, or a promoted de-ranked subordinate clause; and
individually satisfies the at least two requirements.

24. The computer-implemented method of claim 20,
wherein each clause of the plurality of clauses of the sentence portion of the text data comprises one or more tokens;
wherein each token of the one or more tokens comprises one or more characters of the text data; and
wherein the defined hierarchy of clauses is defined based on a dependency tree indicating a dependency of a respective token of the sentence portion of the text data on another token of the sentence portion of the text data.

25. The computer-implemented method of claim 20, wherein the computer-implemented method further comprises:

identifying a de-ranked subordinate clause in the sentence portion of the text data, wherein a meaning communicated by the de-ranked subordinate clause is dependent on a respective parent clause in the text data; and determining that the de-ranked subordinate clause has a same level in the defined hierarchy of clauses as the respective parent clause in the defined hierarchy of clauses.

26. The computer-implemented method of claim 20, wherein the computer-implemented method further comprises:

identifying a balanced subordinate clause in the sentence portion of the text data, wherein a meaning communicated by the balanced subordinate clause is dependent on a respective parent clause in the text data; and determining that the balanced subordinate clause has a level adjacent a respective parent clause in the defined hierarchy of clauses.

27. The computer-implemented method of claim 20, wherein the computer-implemented method further comprises:

identifying multiple main clauses in a same sentence portion of the text data; and determining one clause of the multiple clauses is not hierarchically-related to other clauses of the multiple main clauses in the defined hierarchy of clauses.

28. The computer-implemented method of claim 20, wherein the computer-implemented method further comprises identifying an interrupted clause in the plurality of clauses is split by an embedded clause in the plurality of clauses such that all or a portion of words of the embedded clause is between words of the interrupted clause.

29. The computer-implemented method of claim 20, wherein the text data comprises English language text data.

30. A human language analyzer comprising processor and memory, the memory containing instructions executable by the processor wherein the human language analyzer is configured to:

receive, at the human language analyzer, text data representing information in a human language, the text data comprising a plurality of clauses of a sentence portion;

obtain a data structure defining a defined hierarchy of clauses, wherein the defined hierarchy of clauses associates each clause of the plurality of clauses of the sentence portion with one of a plurality of levels, and wherein the defined hierarchy of clauses defines hierarchy connections between clauses associated with different levels of the plurality of levels;

receive, at the human language analyzer, a computer command for identifying a text data component of the text data, wherein the computer command comprises a first operator and at least two requirements for the text data component, wherein the first operator limits computer identification of the text data component to one or more clauses of the sentence portion that collectively satisfy the at least two requirements and are hierarchically-related according to the hierarchy connections of the defined hierarchy of clauses;

locate, based on the first operator, two clauses of the sentence portion that are on two different levels of the defined hierarchy of clauses and are hierarchically-related according to the hierarchy connections of the defined hierarchy of clauses;

identify that a first requirement of the at least two requirements is met in a first clause of the two clauses;

identify that a second requirement of the at least two requirements is met in the first clause or a second clause of the two clauses;

responsive to identifying that the first requirement is met and identifying that the second requirement is met, locate the text data component from one of the two clauses;

generate, responsive to the computer command, generated data representing the located text data component by the human language analyzer according to the computer command; and output to an output device the generated data.

\* \* \* \* \*